(12) United States Patent
Kasai et al.

(10) Patent No.: US 12,500,061 B2
(45) Date of Patent: Dec. 16, 2025

(54) OBSERVATION SYSTEM, OBSERVATION METHOD, AND PROGRAM

(71) Applicant: Hitachi High-Tech Corporation, Tokyo (JP)

(72) Inventors: Hiroaki Kasai, Tokyo (JP); Kenji Yasui, Tokyo (JP); Mayuka Osaki, Tokyo (JP); Maki Kimura, Tokyo (JP); Makoto Suzuki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 399 days.

(21) Appl. No.: 18/151,530

(22) Filed: Jan. 9, 2023

(65) Prior Publication Data
US 2023/0238210 A1  Jul. 27, 2023

(30) Foreign Application Priority Data
Jan. 25, 2022  (JP) ................................ 2022-009355

(51) Int. Cl.
*H01J 37/22* (2006.01)
*H01J 37/28* (2006.01)

(52) U.S. Cl.
CPC ............ *H01J 37/222* (2013.01); *H01J 37/28* (2013.01); *H01J 2237/24495* (2013.01); *H01J 2237/24578* (2013.01); *H01J 2237/2804* (2013.01)

(58) Field of Classification Search
CPC ..................... H01J 37/222; H01J 37/28; H01J 2237/24495; H01J 2237/24578;
(Continued)

(56) References Cited

U.S. PATENT DOCUMENTS

| 4,866,273 A | * | 9/1989 | Kobayashi | ............ | H01J 37/222 |
| | | | | | 250/311 |
| 5,502,306 A | * | 3/1996 | Meisburger | ............. | H01J 37/28 |
| | | | | | 250/397 |

(Continued)

FOREIGN PATENT DOCUMENTS

| JP | H08306332 A | * | 11/1996 |
| JP | 2008066065 A | * | 3/2008 |

(Continued)

OTHER PUBLICATIONS

Korean Office Action issued in corresponding KR Patent Application No. 10-2023-0002657, dated Dec. 13, 2024 with English translation (9 pages).

(Continued)

*Primary Examiner* — David A Vanore
(74) *Attorney, Agent, or Firm* — Foley & Lardner LLP

(57) ABSTRACT

The invention provides an observation system capable of observing a formation position of a target shape that cannot be directly irradiated with an electron beam. The observation system includes an electron microscope and a computer. The electron microscope is configured to irradiate, with an electron beam, a first surface position on a specimen, which is different from a formation position of a target shape on the specimen, detect predetermined electrons that are scattered in the specimen from the first surface position and that escape from the formation position of the target shape to an outside of the specimen, and output the predetermined electrons as a detection signal. The computer is configured to output one or more values related to the target shape based on the detection signal.

15 Claims, 10 Drawing Sheets

(58) Field of Classification Search
CPC ......... H01J 2237/2804; H01J 2237/226; H01J 2237/2814; H01J 2237/2817; H01J 37/252; H01J 37/244
See application file for complete search history.

(56) References Cited

U.S. PATENT DOCUMENTS

| | | | | |
|---|---|---|---|---|
| 5,665,968 | A * | 9/1997 | Meisburger | H01J 37/3005 |
| | | | | 250/306 |
| 5,866,905 | A * | 2/1999 | Kakibayashi | H01J 37/28 |
| | | | | 250/311 |
| 6,130,434 | A * | 10/2000 | Mitchell | G01N 23/2204 |
| | | | | 850/10 |
| 6,232,787 | B1 * | 5/2001 | Lo | H01J 37/268 |
| | | | | 250/311 |
| 6,344,750 | B1 * | 2/2002 | Lo | G01R 31/307 |
| | | | | 850/10 |
| 6,433,561 | B1 * | 8/2002 | Satya | G01R 31/307 |
| | | | | 324/762.01 |
| 9,190,240 | B2 | 11/2015 | Tanaka | |
| 10,692,693 | B2 * | 6/2020 | Sun | H01J 37/28 |
| 10,879,035 | B2 * | 12/2020 | Mizuno | H01J 37/3056 |
| 11,211,226 | B2 * | 12/2021 | Yokosuka | G03F 7/70625 |
| 11,302,513 | B2 * | 4/2022 | Nishihata | G01N 23/203 |
| 2002/0179851 | A1 * | 12/2002 | Sato | H01J 37/28 |
| | | | | 250/491.1 |
| 2003/0111602 | A1 * | 6/2003 | Sato | H01J 37/222 |
| | | | | 250/307 |
| 2021/0027983 | A1 * | 1/2021 | Nishihata | H01J 37/244 |
| 2021/0090852 | A1 | 3/2021 | Yuli et al. | |
| 2022/0230842 | A1 * | 7/2022 | Sun | H01J 37/28 |
| 2022/0359151 | A1 | 11/2022 | Sun et al. | |
| 2023/0013887 | A1 * | 1/2023 | Ito | G06T 7/0006 |
| 2023/0238212 | A1 * | 7/2023 | Shichi | H01J 37/244 |
| | | | | 250/310 |
| 2024/0159690 | A1 * | 5/2024 | Shiratori | G01N 23/04 |

FOREIGN PATENT DOCUMENTS

| | | | | |
|---|---|---|---|---|
| JP | 2010533352 | A * | 10/2010 | H01J 37/026 |
| JP | 5589964 | B2 * | 9/2014 | |
| JP | 2014-216213 | A | 11/2014 | |
| JP | 2019-087518 | A | 6/2019 | |
| JP | 2019-184354 | A | 10/2019 | |
| JP | 2019-185972 | A | 10/2019 | |
| KR | 20200118756 | A | 10/2020 | |
| WO | WO-2020/225876 | A1 | 11/2020 | |
| WO | WO-2021/140662 | A1 | 7/2021 | |

OTHER PUBLICATIONS

Japanese Office Action issued in corresponding JP Patent Application No. 2022-009355, dated Jan. 7, 2025 with English translation (10 pages).

* cited by examiner

1: OBSERVATION SYSTEM
100: ELECTRON MICROSCOPE
103: ELECTRON BEAM
108: SPECIMEN
120: CONTROL DEVICE

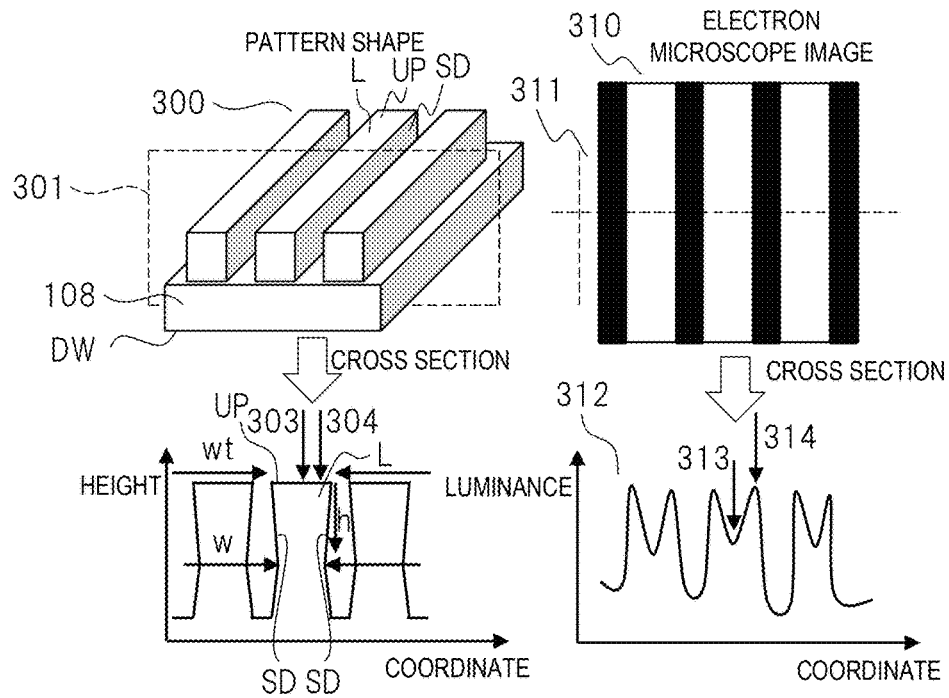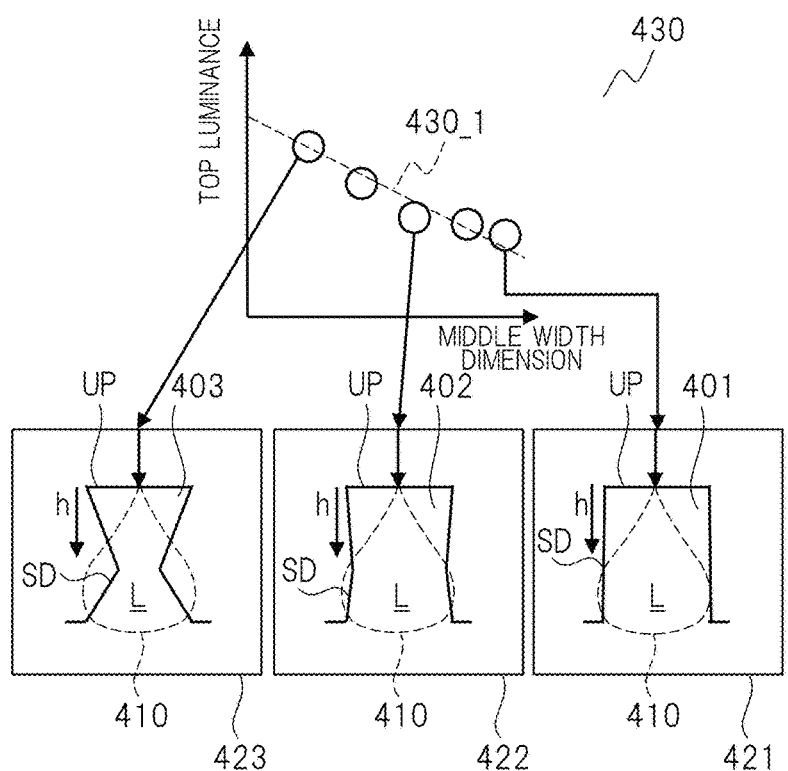

OBSERVATION SYSTEM, OBSERVATION METHOD, AND PROGRAM

BACKGROUND OF THE INVENTION

1. Field of the Invention

The present invention relates to an observation system, an observation method, and a program, and relates to, for example, an observation system, an observation method, and a program for performing observation based on an image (electron microscope image) captured by an electron microscope.

2. Description of Related Art

A technique for observing a specimen using an electron microscope is described in, for example, JP2019-185972A.

That is, JP2019-185972A describes a technique for estimating a depth of a pattern on a specimen irradiated with primary electrons by a primary electron beam radiation unit provided in an electron microscope.

In JP2019-185972A, in order to observe the depth of the pattern formed on the specimen, a portion to be observed is directly irradiated with an electron beam, and the depth of the pattern is observed based on a signal detected by the irradiation with the electron beam. In other words, in the technique described in JP2019-185972A, a problem arises that, when a portion that cannot be directly irradiated with the electron beam is taken as a target portion, such a target portion cannot be observed.

SUMMARY OF THE INVENTION

An object of the invention is to provide an observation system, an observation method, and a program capable of observing a target portion that cannot be directly irradiated with an electron beam.

Other objects and novel features of the invention will become apparent based on the description and the accompanying drawings.

An outline of a representative embodiment among embodiments disclosed in the present application will be briefly described as follows.

That is, an observation system according to the embodiment includes an electron microscope and a computer.

The electron microscope is configured to irradiate, with electrons, a first surface position on a specimen, which is different from a formation position (target portion) of a target shape on the specimen, detect predetermined electrons that are scattered in the specimen from the first surface position and that escape from the formation position of the target shape to an outside of the specimen, and output the predetermined electrons as a detection signal. The computer is configured to output one or more values related to the target shape based on the detection signal.

In another embodiment, an observation method is provided. In another embodiment, a program executed by a processor is provided in order to obtain a shape change in a target shape on a specimen.

Regarding the brief description of an effect exerted by the representative embodiment among the inventions disclosed in the present application, it is possible to provide an observation system capable of observing a formation position of a target shape that cannot be directly irradiated with an electron beam.

BRIEF DESCRIPTION OF THE DRAWINGS

FIGS. 3A to 3D are diagrams showing a pattern shape formed on a specimen and an electron microscope image of the pattern shape;

FIG. 4 is an explanatory diagram showing a principle of the observation system according to the first embodiment;

DESCRIPTION OF EMBODIMENTS

Embodiments will be described with reference to drawings. The embodiments described below do not limit the invention according to the claims, and all elements and combinations thereof described in the embodiments are not necessarily essential to the solution of the invention.

According to the invention, a shape of a target portion (target shape) to be observed is observed, and in the embodiments described below, the shape is observed as a change amount of the target shape with respect to a reference shape that is a reference. That is, the target shape is observed as a relative amount with respect to the reference shape. Of course, the reference shape is fixed, and the change amount may be observed as an absolute amount.

An example of the reference shape will be described later with reference to FIG. 7 and the like.

First Embodiment

Overall Configuration of Observation System

Figure 1:
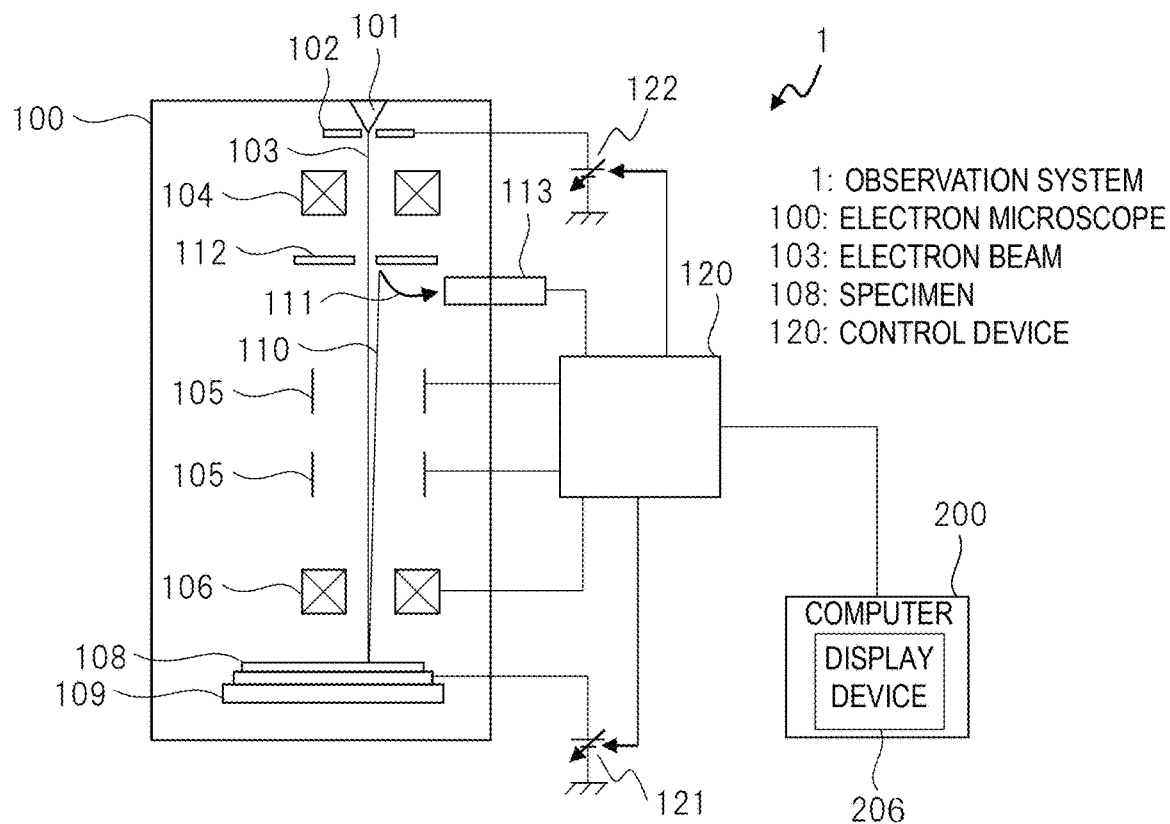
FIG. 1 is a block diagram showing a configuration of an observation system according to a first embodiment.

FIG. 1 is a block diagram showing a configuration of an observation system according to a first embodiment. In FIG. 1, a reference numeral 1 indicates the observation system. The observation system 1 includes an electron microscope 100, a control device 120, power supply devices 121 and 122, and a computer 200.

In the electron microscope 100, a specimen is irradiated with an electron beam 103. The electron microscope 100 outputs a detection signal obtained based on the irradiation with the electron beam 103. The observation system 1 includes a component necessary for forming a signal waveform or an image based on the detection signal output from the electron microscope 100. First, an example of the electron microscope 100 will be specifically described with reference to FIG. 1.

The electron beam 103 extracted from an electron source 101 by an extraction electrode 102 is accelerated by an acceleration electrode (not shown). The accelerated electron beam 103 is condensed by a condenser lens 104 that is a form of a converging lens. The condensed electron beam 103 one-dimensionally or two-dimensionally scans a specimen 108 by scanning electrodes 105. The electron beam 103 is decelerated by a negative voltage applied to an electrode built in a specimen stage 109, is focused by a lens action of an object lens 106, and is emitted to the specimen 108.

When the electron beam 103 is emitted to the specimen 108, the electron beam 103 is scattered inside the specimen 108 from an irradiated portion, and is emitted as electrons 110 such as secondary electrons and backscattered electrons from a portion different from the irradiated portion. The emitted electrons 110 are accelerated in a direction of the electron source 101 by an acceleration action based on the negative voltage applied to the specimen 108, collide with a conversion electrode 112, and generate secondary electrons 111. The secondary electrons 111 emitted from the conversion electrode 112 are captured by a detector 113, and a detection signal that is an output of the detector 113 changes depending on the number of the captured secondary electrons 111.

The detection signal output from the detector 113 is supplied to the computer 200 by the control device 120. The computer 200 includes a display device (not shown). A luminance of an image displayed on the display device changes according to the detection signal. That is, the number of the electrons captured by the detector 113 is displayed on the display device as the luminance.

For example, when a two-dimensional image is displayed on the display device, a luminance of the image in a scanning region scanned by a deflection signal supplied to the scanning electrodes 105 is displayed on the display device by synchronizing the deflection signal with a detection signal output from the detector 113.

Although not particularly limited, the electron microscope 100 shown in FIG. 1 includes a deflector (not shown) that moves a scanning region of the electron beam 103. This deflector is used to display, on the display device, an image of a pattern of the same shape present at different positions. This deflector is also referred to as an image shift deflector, and can move a visual field position of the electron microscope 100 without moving the specimen 108 by the specimen stage (for example, the specimen stage 109) that moves the specimen 108. The image shift deflector and the scanning electrodes 105 may be used as a common deflector, and an image shift signal and a deflection signal may be superimposed and supplied to the deflector.

The detection signal (image, luminance profile, luminance, and the like) from the electron microscope 100 is supplied to the computer 200 by the control device 120. The computer 200 calculates a value related to a shape change in a target shape to be observed based on the supplied detection signal, and outputs one or more such calculated values. The computer 200 may be integrated with the electron microscope 100.

The control device 120 controls the power supply devices 121 and 122 according to an instruction from the computer 200. By controlling the power supply device 122, voltages applied to the extraction electrode 102 and the acceleration electrode (not shown) change. Similarly, by controlling the power supply device 121, a voltage applied to the specimen 108 changes. The control device 120 controls the deflection signal supplied to the scanning electrode 105 and controls a signal supplied to the object lens 106 according to instructions from the computer 200. As described above, the control device 120 supplies the detection signal output from the detector 113 to the computer 200.

Configuration of Computer

Figure 2:
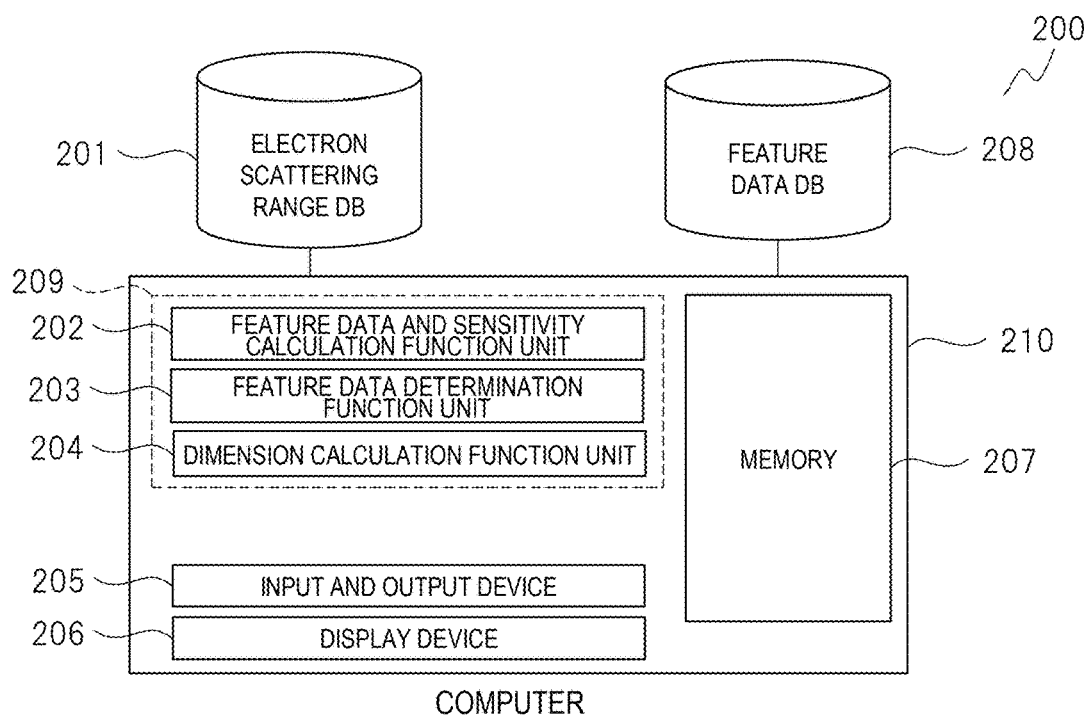
FIG. 2 is a block diagram showing a configuration of a computer according to the first embodiment.

Next, the computer 200 according to the first embodiment will be described with reference to the drawings. FIG. 2 is a block diagram showing a configuration of the computer according to the first embodiment.

Although the computer 200 includes a plurality of functional blocks, only functional blocks necessary for the description are illustrated in FIG. 2. In FIG. 2, a reference numeral 210 indicates a computer core (hereinafter, also simply referred to as a computer), a reference numeral 201 indicates a scattering range database (hereinafter, also referred to as an electron scattering range DB) of electrons, and a reference numeral 208 indicates a database (hereinafter also referred to as a feature data DB) of feature data. The electron scattering range DB 201 and the feature data DB 208 are databases stored in a storage device (not shown) coupled to the computer 210.

In the electron scattering range DB 201, an electron scattering range for each acceleration voltage for accelerating the electron beam 103 (see FIG. 1) and each material of the specimen 108 (see FIG. 1) are registered. Here, the electron scattering range indicates a range in which electrons incident on the specimen 108 formed of, for example, a single material are scattered. The range in which the electrons are scattered can be obtained by, for example, executing a simulation using the acceleration voltage and the material of the specimen as parameters, that is, by executing an electron scattering simulation. An example of the electron scattering simulation is a Monte Carlo simulation. Of course, the parameters used to execute the electron scattering simulation are not limited to the acceleration voltage and the material of the specimen.

In the feature data DB 208, a feature data group of the image of the specimen 108 is registered. The feature data is, for example, a luminance (hereinafter also referred to as a pattern top luminance or a top luminance) of a pattern top, a luminance (hereinafter also referred to as a pattern edge luminance or an edge luminance) of a pattern edge, a luminance of a region between the pattern top and the pattern edge, or differential values thereof. The feature data is used to represent a feature of a pattern shape at a position (target portion) that cannot be directly irradiated with the electron beam in the first embodiment. The feature data may not be registered in the database as described above. For example, a user may design the feature data based on the image of the specimen 108 and input the feature data to the computer core 210. Since examples of the pattern top luminance and the pattern edge luminance related to the feature data will be described later with reference to FIG. 3, the detailed description thereof is omitted here.

The computer 210 includes a processor 209 that executes a program, and an input and output device 205, a display device 206, and a memory 207 that are coupled to the processor 209. The input and output device 205 is, for example, a mouse and a keyboard, and is used by the user to input data, an instruction, and the like to the processor 209. The display device 206 is used to display data and the like obtained by the processor 209. The memory 207 is used to store data and the like when the processor 209 executes a program.

The processor 209 reads and executes a program stored in, for example, a storage medium (not shown). Functional units implemented in the processor 209 by executing the program are shown, in FIG. 2, as a feature data and sensitivity calculation function unit 202, a feature data determination function unit 203, and a dimension calculation function unit 204 that obtains (calculates) one or more values related to the change of the target shape and that outputs the one or more values.

The feature data and sensitivity calculation function unit 202 obtains, by calculation, feature data and a sensitivity of an image with respect to the shape change in the target shape in the target portion based on a pattern of the specimen 108 input by the user using the input and output device 205, information of the target portion to be observed, information of the electron scattering range registered in the electron scattering range DB 201, and the feature data registered in the feature data DB 208. Based on the obtained feature data and the obtained sensitivity of the image, the feature data determination function unit 203 determines, in consideration of the sensitivity, a variation, and the like, feature data and a sensitivity that are used when the shape change in the target shape is observed.

Based on the detection signal actually supplied from the electron microscope 100 (FIG. 1) via the control device 120 (FIG. 1), the dimension calculation function unit 204 obtains, by calculation, the value related to the shape change in the target shape using the feature data and the sensitivity that are determined by the feature data determination function unit 203 or the feature data and the sensitivity that are obtained by the feature data and sensitivity calculation function unit 202. The one or more values obtained by the dimension calculation function unit 204 are displayed by the display device 206.

FIG. 2 shows an example in which the feature data determination function unit 203 is used to obtain the value related to the shape change in the target shape, and the feature data determination function unit 203 is not essential. For example, instead of the feature data determination function unit 203, the feature data and the sensitivity that are obtained by the feature data and sensitivity calculation function unit 202 may be displayed on the display device 206, and the user may determine the feature data and the sensitivity to be used and may input the determined feature data and sensitivity using the input and output device 205. In addition, a plurality of pieces of feature data and sensitivities obtained by the feature data and sensitivity calculation function unit 202 may be displayed on the display device 206, and the user may select appropriate feature data and sensitivity from the plurality of pieces of feature data and sensitivities. In this case, the dimension calculation function unit 204 obtains the one or more values related to the shape change in the target shape using the feature data and the sensitivity that are input or selected by the user, and outputs the values.

In the first embodiment, the electron scattering range DB 201 is created in advance for each material and each acceleration voltage by, for example, the Monte Carlo simulation, as described above. In FIG. 2, the electron scattering range DB 201 is provided in the computer 200, but the invention is not limited thereto. For example, the electron scattering range DB may be provided in a server provided outside the computer 200, and the electron scattering range may be provided to the computer 200 by a communication unit connecting the server and the computer 200.

Further, the electron scattering range may be obtained in the computer 200 without using the electron scattering range DB 201. For example, the computer 200 may implement an electron scattering range calculation function unit (not shown) that prepares a program for simulating the electron scattering range (scattering simulation), that causes the processor 209 to execute the program, and that obtains the electron scattering range by the processor 209. In this case, the user uses the input and output device 205 to supply, for example, the acceleration voltage and the material of the specimen 108 to the electron scattering range calculation function unit. The electron scattering range obtained by the electron scattering range calculation function unit is used instead of the electron scattering range registered in the electron scattering range DB 201. In this case, the electron scattering range DB 201 is not essential, and the electron scattering range is generated according to the input of the acceleration voltage and the material of the specimen 108 by the user.

Example of Pattern Shape Formed on Specimen

Next, an example of the pattern shape formed on the specimen 108 and an example of an electron microscope image obtained when the pattern shape is imaged (observed) by the electron microscope 100 will be described with reference to the drawings. FIGS. 3A to 3D are diagrams showing the pattern shape formed on the specimen and the electron microscope image of the pattern shape. Here, FIG. 3A shows a perspective view of the pattern shape, and FIG. 3B shows the electron microscope image. FIG. 3C shows a cross-sectional view of the pattern shape shown in FIG. 3A, and FIG. 3D shows a luminance profile (change of a luminance represented by a coordinate change) in the electron microscope image shown in FIG. 3B.

Here, a semiconductor wafer used for manufacturing a semiconductor device will be described as an example of the specimen 108. Since the specimen is the semiconductor wafer, the material of the specimen 108 is silicon (Si). A pattern shape 300 as shown in FIG. 3A is formed by etching the specimen 108. Here, a line and space (L/S) having a bowing shape will be described as an example of a pattern of the pattern shape 300.

In FIG. 3A, UP indicates a main surface (first surface) of the line L of the pattern shape 300, and SD indicates a side wall (second surface) of the line L. DW indicates a back surface of the specimen 108 facing the main surface UP.

An electron microscope image 310 in FIG. 3B is an image captured by the electron microscope 100 from vertically above the specimen 108. That is, the electron microscope image 310 is an image captured by emitting the electron beam 103 from vertically above the main surface UP toward the specimen 108. When the electron beam 103 is emitted to the main surface UP, the side wall SD and the back surface DW are portions that are not directly irradiated with the electron beam 103.

FIG. 3C shows a cross section 302 of the pattern shape 300 at a cross-sectional position 301 in the pattern shape 300 shown in FIG. 3A. FIG. 3D shows a luminance profile 312 at a cross-sectional position 311 in the electron microscope image 310 shown in FIG. 3B.

Here, the bowing shape will be described. As shown in FIG. 3C, the bowing shape refers to a shape in which, in the cross section 302, a width dimension w at a position (for example, a position at a depth h) below a pattern top that is the main surface UP of the line L is smaller than a width dimension wt of the pattern top, and in which the side wall SD cannot be directly viewed from vertically above the specimen 108 (main surface UP). In FIG. 3C, a width dimension increases again from the depth h toward a lower side. However, when viewed in the cross-sectional view, it is assumed that a so-called reverse taper shape, in which a width of the line L that is the pattern becomes smaller from the pattern top (main surface UP) toward the bottom (back surface DW), is also a part of the bowing shape. The bowing shape is not particularly limited, and is generated by, for example, over-etching the semiconductor wafer.

In the following description, it is assumed that the pattern top indicates a position of a center portion of the pattern top (main surface UP) of the line L which is indicated by an arrow 303 in FIG. 3C. An image luminance in the electron microscope image of the pattern top is a pattern top luminance at a position indicated by an arrow 313 in FIG. 3D. Further, it is assumed that a pattern edge indicates a position in the vicinity of the pattern edge of the line L which is indicated by an arrow 304 in FIG. 3C. An image luminance in the electron microscope image of the pattern edge is a pattern edge luminance at a position indicated by an arrow 314 in FIG. 3D. As shown in FIG. 3D, the image luminance of the pattern edge luminance 314 is a local maximum value. In other words, the local maximum value of the image luminance is the pattern edge luminance 314.

In the electron microscope 100, as described above, the electron beam 103 is emitted from vertically above the main surface UP toward the specimen 108. In the bowing shape, since the width dimension of the line L at the position below the pattern top is smaller than that of the pattern top, the side wall SD of the line L is not directly irradiated with the electron beam 103. Therefore, it is difficult to observe the side wall SD in the electron microscope 100.

Description of Principle

In the first embodiment, the side wall of the pattern shape having a shape such as the bowing shape when viewed in the cross-sectional view is observed using the pattern top luminance or/and the pattern edge luminance as the feature data. For example, in the first embodiment, a dimensional change of the width dimension w (hereinafter, also referred to as a middle width dimension) at the position that includes the bowing shape, that is below the pattern top, and that is not directly irradiated with the electron beam is observed using the pattern top luminance as the feature data. Next, a principle for observing the dimensional change of the middle width dimension using the feature data will be described with reference to the drawings.

FIG. 4 is an explanatory diagram showing the principle of the observation system according to the first embodiment. In FIG. 4, a reference numeral 401 indicates a pattern shape (cross-sectional pattern shape) of an outer shape of the line L that does not have the bowing shape, and reference numerals 402 and 403 indicate pattern shapes (cross-sectional pattern shapes) of outer shapes of the line L that has bowing shapes. As shown in FIG. 4, middle width dimensions w of the pattern shapes 401 to 403 are different from one another, and the middle width dimensions w increase from the pattern shape 403 to the pattern shape 401. A shape of a broken line 410 drawn in a manner of overlapping with the pattern shapes 401 to 403 indicates a scattering range of electrons scattered inside and outside the specimen when the pattern top is irradiated with the electron beam.

In FIG. 4, reference numerals 421 to 423 are cross-sectional views in which the pattern shapes 401 to 403 and the electron scattering range 410 are drawn in a manner of overlapping with each other. As can be seen from the cross-sectional views 421 to 423, at a position at the depth h from the main surface UP, that is, a measurement position of the middle width dimension w, the number of the electrons escaping from the side wall SD of the line L to the outside of the specimen changes due to the change of the bowing shape. That is, the change of the bowing shape can be observed by observing the number of electrons escaping from the side wall SD to the outside. A part of the electrons escaping from the side wall SD to the outside are reflected by, for example, side walls of adjacent lines, are attracted toward the electron source 101 by an electric field, and become the electrons 110 directed toward the electron source 101 shown in FIG. 1. Since the electron microscope 100 outputs the detection signal based on the secondary electrons 111 generated by the electrons 110, the luminance represented by the detection signal changes depending on the number of electrons escaping from the side wall SD to the outside.

Here, the electrons escaping from the side wall SD to the outside have been described, but the electrons 110 also include electrons that are reflected on the side wall SD in the specimen, that are scattered in the specimen, and that are directed from the main surface UP toward the electron source 101. Therefore, the luminance represented by the detection signal changes also depending on the number of electrons reflected by the side wall SD in the specimen.

Specifically, the following will be described with reference to the cross-sectional views 421 to 423.

As shown in the cross-sectional view 421, in the pattern shape 401 in which the middle width dimension w is large, the number of electrons escaping to the outside of the pattern shape 401 at a middle width observation position at the depth h is relatively small. Therefore, the pattern top luminance 313 (FIG. 3D) is relatively small. In contrast, as shown in the cross-sectional view 423, in the pattern shape 403 in which the middle width dimension w is small, the number of electrons escaping to the outside of the pattern shape 403 at a middle width observation position at the depth h is relatively large. Therefore, the pattern top luminance 313 (FIG. 3D) becomes relatively large.

In the pattern shape 402 in which the middle width dimension w at a middle width observation position at the depth h is a value between the middle width dimension w of the pattern shape 401 and the middle width dimension w of the pattern shape 403, as shown in the cross-sectional view 422, the number of electrons escaping to the outside of the pattern shape 402 at the middle width observation position is a value between those of the pattern shapes 401 and 403. Therefore, the pattern top luminance 313 also becomes a value between those of the pattern shapes 401 and 403. The pattern top luminance 313 is represented by the detection signal output from the electron microscope 100.

That is, the pattern top luminance 313 changes depending on the middle width dimension w. In FIG. 4, a reference numeral 430 indicates a correlation graph showing a correlation between the pattern top luminance 313 (described as the top luminance in FIG. 4) and the middle width dimension. As shown in the correlation graph 430, as the middle width dimension increases, the pattern top luminance decreases. By using the correlation graph 430, the middle width dimension can also be obtained when the bowing shape is present based on the pattern top luminance.

In the first embodiment, the bowing shape is the target shape to be observed. The side wall SD having the bowing shape cannot be directly irradiated with the electron beam. However, according to the first embodiment, the value related to the target shape can be obtained based on a detection signal obtained by directly irradiating, with the electrons (electron beam), a surface (main surface UP) that is a position of the specimen different from the target portion (side wall SD) at which the target shape is formed.

The value related to the target shape can be calculated by digitizing the correlation graph 430 based on the pattern top luminance represented by the detection signal. For example, in the correlation graph 430, the change of the pattern top luminance associated with the change of the middle width dimension can be fitted by a linear function to obtain a regression line 430_1, and the middle width dimension w can be calculated based the pattern top luminance using the regression line 430_1. In this case, a slope of the regression line 430_1 can be regarded as a sensitivity indicating a change amount of the pattern top luminance due to the change of the middle width dimension.

Operation of Observation System

Figure 5:
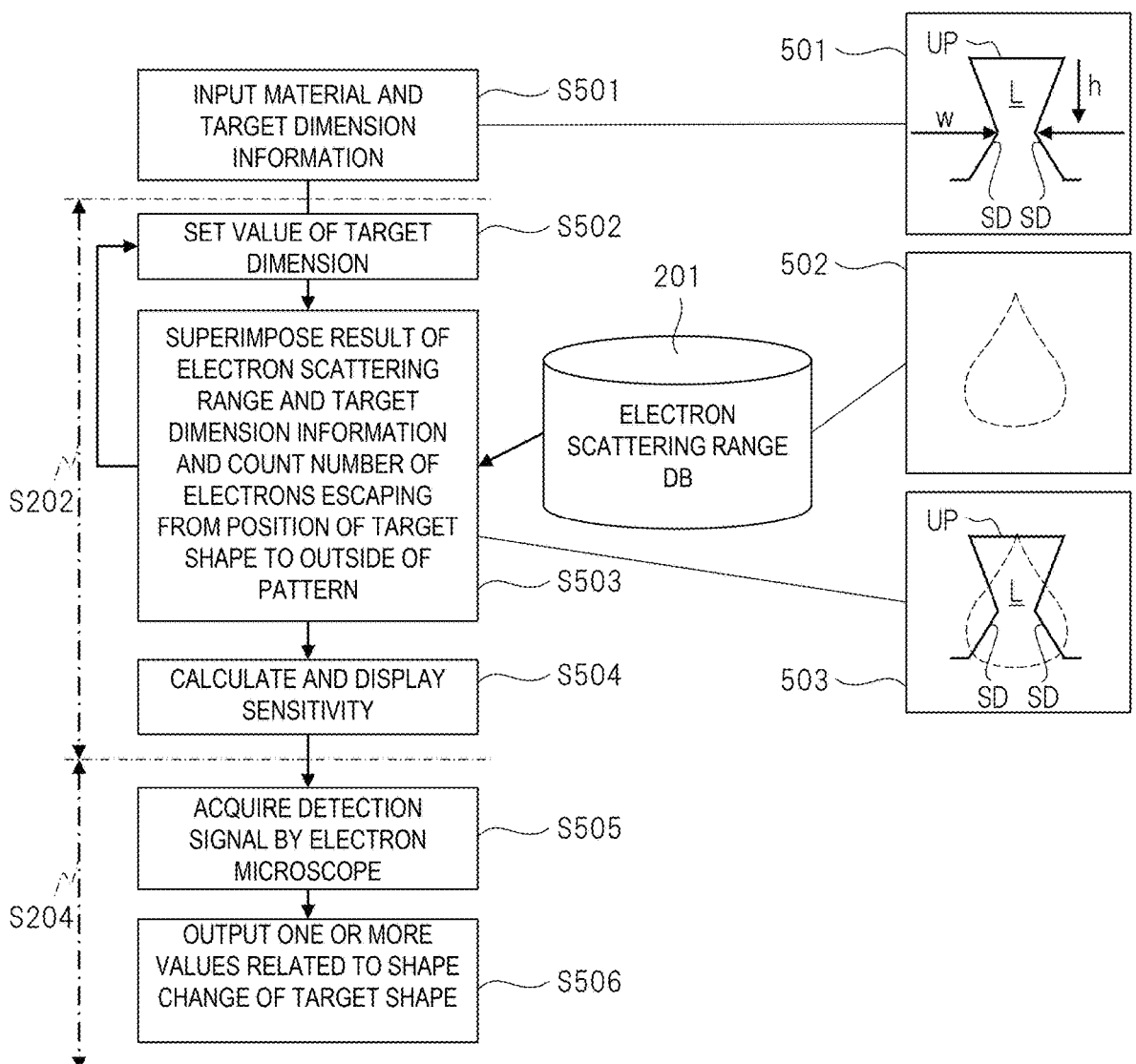
FIG. 5 is a flowchart showing an operation of the observation system according to the first embodiment.

FIG. 5 is a flowchart showing an operation of the observation system according to the first embodiment. The operation of the observation system according to the first embodiment will be described with reference to FIGS. 1, 2, and 5.

In step S501 in FIG. 5, the user inputs the material of the specimen 108 and target dimension information 501 of the target portion to the processor 209 (FIG. 2) by operating the input and output device 205 (FIG. 2). In FIG. 5, the middle width dimension w at the position at the depth h from the main surface UP of the line L is shown as the information 501. Although not shown in FIG. 5, the silicon is input as the material of the specimen.

The processor 209 of the computer 210 executes programs corresponding to processes in steps S502 to S506. Here, the feature data and sensitivity calculation function unit 202 shown in FIG. 2 is implemented on the processor 209 by executing, by the processor 209, a program corresponding to step S202 including steps S502 to S504. The dimension calculation function unit 204 shown in FIG. 2 is implemented on the processor 209 by executing, by the processor 209, a program corresponding to step S204 including steps S505 and S506.

In step S502, the value of the target dimension (for example, the middle width dimension) input in step S501 is set in the processor 209. In step S503, the processor 209 acquires an electron scattering range 502 from the electron scattering range DB 201 (FIG. 2), superimposes the set target dimension information 501 and the electron scattering range 502, and counts the number of electrons escaping from the side wall SD that is the target shape to the outside of the line L, that is, the outside of the pattern shape of the line L, as indicated by a reference numeral 503 in FIG. 5.

When the counting of the number of electrons escaping to the outside of the pattern shape is completed, the processor 209 executes step S502 again. In this case, the processor 209 updates the value of the target dimension (middle width dimension) in step S502. Thereafter, the processor 209 executes step S503 again. Since the value of the target dimension is updated, the number of electrons corresponding to the updated value of the target dimension is counted by the processor 209 by executing step S503 again.

The processor 209 repeats steps S502 and S503 until the value of the target dimension reaches a predetermined value. By repeating steps S502 and S503, a plurality of numbers of electrons corresponding to a plurality of target dimensions (middle width dimensions) are obtained. That is, by repeating steps S502 and S503, the processor 209 executes a first process of obtaining a change of the number of electrons associated with a dimensional change in the target dimension.

Next, the processor 209 calculates the sensitivity in step S504 (second process) using the plurality of target dimensions obtained in step S503 and a plurality of corresponding numbers of electrons. For example, the processor 209 obtains the slope of the regression line 430_1 as the sensitivity using the plurality of target dimensions as a horizontal axis of the correlation graph 430 in FIG. 4 and a top luminance corresponding to the plurality of numbers of electrons as a vertical axis of the correlation graph 430. In addition, although not particularly limited, the processor 209 displays the obtained sensitivity on the display device 206 of the computer 210 in step S504.

After steps S501 to S504 described above are executed in advance, observation using the detection signal from the electron microscope 100 is performed. That is, in the computer 210, the processor 209 executes step S202 in advance to obtain the sensitivity. Thereafter, the processor 209 observes the shape change in the target shape using the sensitivity obtained in advance and the detection signal output from the electron microscope 100.

That is, in next step S505, the processor 209 acquires the detection signal output from the electron microscope 100 via the control device 120. Thereafter, in step S506, the processor 209 outputs one or more values related to the shape change in the target shape using the sensitivity and the detection signal. The output values include the change of the middle width dimension, the change in the pattern top luminance, a change in the pattern edge luminance, and the like.

When the processor 209 executes, for example, steps S503 and S505, the processor 209 also acquires and uses information on the feature data (pattern top and pattern edge) from the feature data DB 208 (FIG. 2). For example, the processor 209 uses the information acquired from the feature data DB 208 in order to determine a position of the pattern top when the electron scattering range and the pattern shape are superimposed.

According to the first embodiment, by irradiating the main surface UP of the specimen with the electron beam, the change in the target shape in the target portion (side wall SD) that cannot be directly irradiated with the electron beam can be observed based on the values output in step S506.

First Modification

Next, an observation system using the feature data determination function unit 203 shown in FIG. 2 will be described as the first modification.

In the first modification, an observation system is provided in which the feature data is optimized, and in which the value related to the shape change in the target shape can be output using the optimized feature data.

Figure 6:
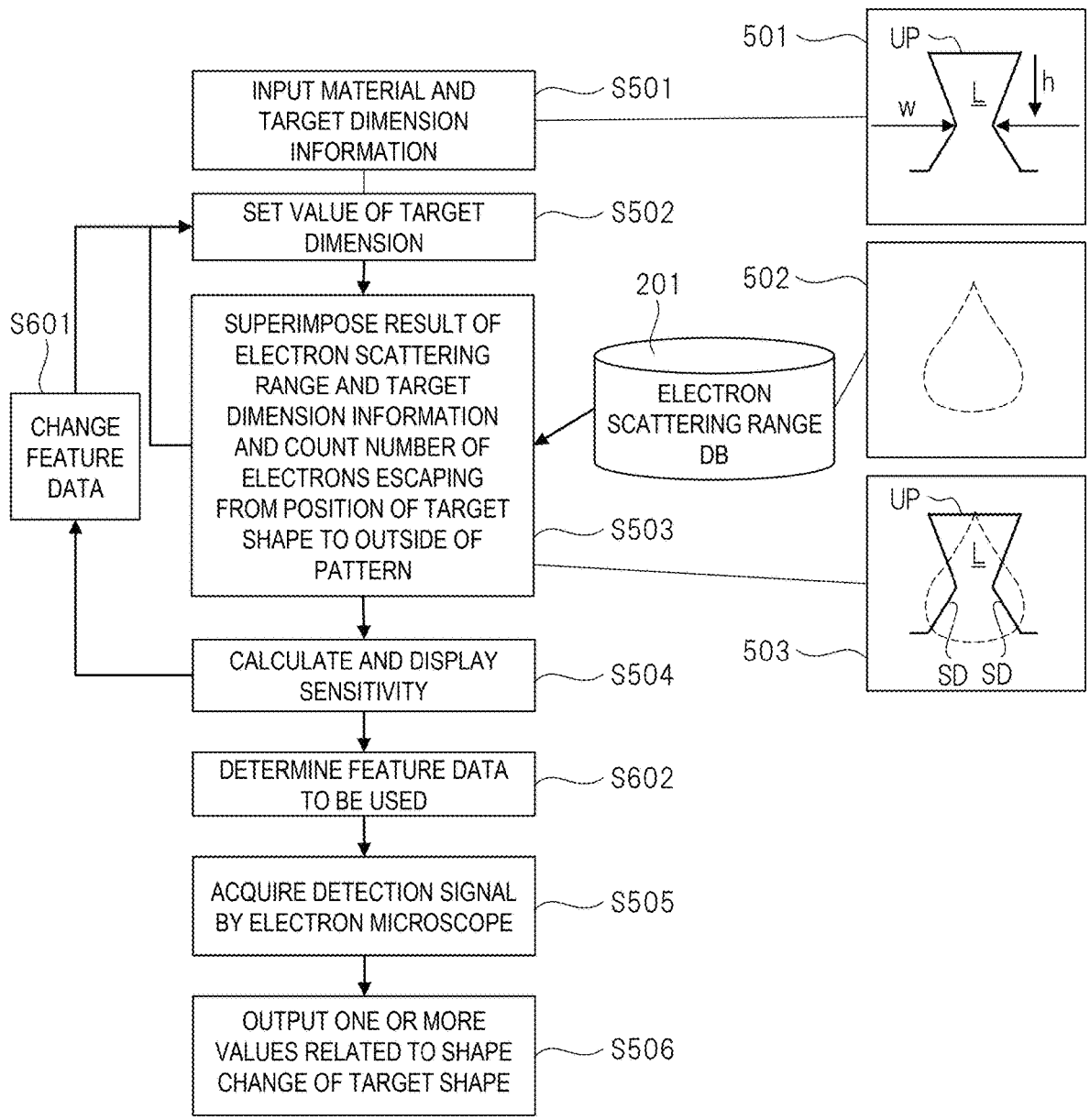
FIG. 6 is a flowchart showing an operation of an observation system according to a first modification of the first embodiment.

FIG. 6 is a flowchart showing an operation of the observation system according to the first modification of the first embodiment. Since FIG. 6 is similar to FIG. 5, a difference will be mainly described. The difference is that, in FIG. 6, steps S601 and S602 are added to the flowchart of FIG. 5. In FIG. 6, since the drawing is complicated, broken lines indicating boundaries of steps S202 and S204 are omitted.

The feature data determination function unit 203 shown in FIG. 2 is implemented on the processor 209 by the processor 209 executing a program corresponding to steps S601 and S602 added in FIG. 6.

The feature data includes the pattern top luminance 313 and the pattern edge luminance 314 that are shown in FIG. 3D, a luminance at any position between the pattern top and the pattern edge, and a value obtained by combining these luminances (for example, a luminance change amount between the pattern top luminance and the pattern edge luminance), but is not limited to these values. Alternatively, the feature data may be information related to a luminance other than these values. In the first modification, the pattern top luminance 313 and the pattern edge luminance 314 will be described as an example of the feature data.

In step S601, the processor 209 changes the feature data used for calculating the sensitivity. In the first modification, the processor 209 selects to use the pattern top luminance 313 as the feature data, and then changes the feature data to the pattern edge luminance 314.

In step S601, the processor 209 selects the pattern top luminance 313 as the feature data, and repeatedly executes steps S502 to S504. By executing this process, the sensitivity is calculated as described with reference to FIG. 5. That is, the correlation graph 430 (FIG. 4) showing the correlation between the middle width dimension w and the pattern top luminance 313 is generated, and the slope of the regression line 430_1 is obtained as the sensitivity related to the pattern top luminance.

When the calculation of the sensitivity related to the middle width dimension w and the pattern top luminance 313 is completed in step S504, the processor 209 selects the pattern edge luminance 314 as the feature data in step S601. Thereafter, the processor 209 repeatedly executes steps S502 to S504 to calculate a sensitivity related to the middle width dimension w and the pattern edge luminance 314. That is, a correlation graph showing a correlation between the middle width dimension w and the pattern edge luminance 314 is generated, and a slope of a regression line in the correlation graph is obtained as a sensitivity related to the pattern edge.

When the calculation of the sensitivity related to the pattern edge luminance is completed in step S504, the processor 209 executes step S602. In step S602, the processor 209 determines feature data and a sensitivity to be used, based on the previously obtained sensitivity related to the pattern top luminance and the previously obtained sensitivity related to the pattern edge luminance. For example, the processor 209 compares the sensitivity related to the pattern top luminance with the sensitivity related to the pattern edge luminance, selects a highest sensitivity as an optimal sensitivity, and determines to use the optimal sensitivity and optimal feature data (the pattern top luminance or the pattern edge luminance) corresponding to the optimal sensitivity in step S506.

Steps S505 and S506 are similar to those in FIG. 2, and thus the description thereof is omitted. However, the sensitivity used in step S506 is the optimal sensitivity determined in step S602, which is different from FIG. 5.

In FIG. 6, in step S602, the processor 209 selects one related to the high sensitivity, but the invention is not limited thereto. For example, in step S602, the user may select the sensitivity related to the pattern top luminance or the sensitivity related to the pattern edge luminance as the optimal sensitivity.

According to the first modification, since it is possible to output one or more values related to the shape change in the target shape using the optimal sensitivity, it is possible to output a more correct value.

Display Example of Display Device

In the observation system 1 according to the first embodiment, the processor 209 displays, by the display device 206, the feature data and the sensitivity (including the optimal feature data and the optimal sensitivity), and the one or more values related to the shape change in the target shape obtained using the feature data and the sensitivity.

Next, an example of a graphical user interface (GUI) displayed on the display device 206 will be described. FIG. 7 is a diagram showing a configuration of the GUI according to the first embodiment.

The displayed GUI includes an input screen region 701 and an output screen region 751. The user inputs a model (pattern shape, material of a specimen, and the like) of a pattern to be observed in the input screen region 701. The processor 209 (FIG. 2) displays a shape of the model and the material (silicon: Si) in the input screen region 701 according to the input model. The user designates a portion 702 (target dimension in FIG. 7) to be observed in a target shape in the displayed model, and designates a value of the designated portion 702 in target dimension information 703 with a numerical value. The user sets an imaging condition 704 of the electron microscope 100 (FIG. 1). The imaging condition 704 includes an acceleration voltage, a position of the detector 113 (FIG. 1), and the like. For example, a value set as the acceleration voltage is notified to the control device 120 shown in FIG. 1, and the control device 120 controls the power supply devices 121 and 122 according to the notified acceleration voltage.

Thereafter, the user presses a calculation start button 705. When the calculation start button 705 is pressed, the processor 209 executes, for example, steps S502 to S504 and S601 shown in FIG. 6 to calculate a sensitivity and the like.

When the calculation of the sensitivity and the like is completed, the processor 209 displays, in the output screen region 751, that a progress is "calculation completed" so as to indicate that the calculation is completed, and further displays a sensitivity (correlation graph) for each piece of feature data 752, a feature data and sensitivity list 753, and optimal feature data 754. FIG. 7 shows a case in which the pattern top luminance (top luminance) and the pattern edge luminance (edge luminance) are used as the feature data, and in which the pattern top luminance is selected as the optimal feature data in step S602 in FIG. 6, as described in the first modification. In the example shown in FIG. 7, a sensitivity related to the pattern top luminance is 0.7, and a sensitivity related to the pattern edge luminance is 0.2.

Next, when a measurement button 710 displayed in the input screen region 701 is pressed, the processor 209 acquires an image captured by the electron microscope 100 under the condition set in the imaging condition 704, and displays the acquired image 755 in the output screen region 751. The processor 209 executes step S506 shown in FIG. 6, and displays an execution result (value related to the shape change of the target shape) in the output screen region 751. In FIG. 7, a change amount 756 with respect to a reference of the target shape is displayed as the value related to the shape change in the target shape.

Here, a reference shape that is the reference of the target shape will be described. A reference numeral 757 displayed in the output screen region 751 indicates a plan view of a semiconductor wafer that is the specimen 108 (FIG. 1). A plurality of semiconductor chips having the same configuration are formed on the semiconductor wafer 757. In the first embodiment, although not particularly limited, a pattern shape (for example, the line L in FIG. 3) at a predetermined position of a semiconductor chip (reference semiconductor chip) 758 formed at a center position of the semiconductor wafer 757 is used as the reference shape.

That is, for example, a middle width dimension of the reference shape formed in the reference semiconductor chip 758 is used as a reference of a change amount of a middle width dimension of the target shape. Using the middle width dimension of the reference shape in the reference semiconductor chip 758 as the reference, for example, a change amount of a middle width dimension of a pattern shape in each of the semiconductor chips (target semiconductor chips) 759 and 760 is displayed as the change amount 756 with respect to the reference of the target shape. In this case, the pattern shape that is the reference shape and the pattern shape to be measured are arranged at the same positions in the reference semiconductor chip 758 and the target semiconductor chips 759 and 760. FIG. 7 shows an example in which the reference semiconductor chip 758 and the target semiconductor chips 759 and 760 are formed on the same semiconductor wafer 757. Alternatively, for example, the reference semiconductor chip and the target semiconductor chip may be formed on different semiconductor wafers.

It is possible to acquire variation and the like in the semiconductor wafer by outputting the change amount with respect to the reference of the target shape.

When the change amount 756 with respect to the reference of the target shape is displayed, the processor 209 displays that a progress is "measurement completed" in the output screen region 751 so as to indicate that the measurement is completed. Although not shown, a plurality of chips may be measured in the semiconductor wafer, and a distribution (wafer map) of target dimensions in the semiconductor wafer may be created and displayed.

Figure 7:
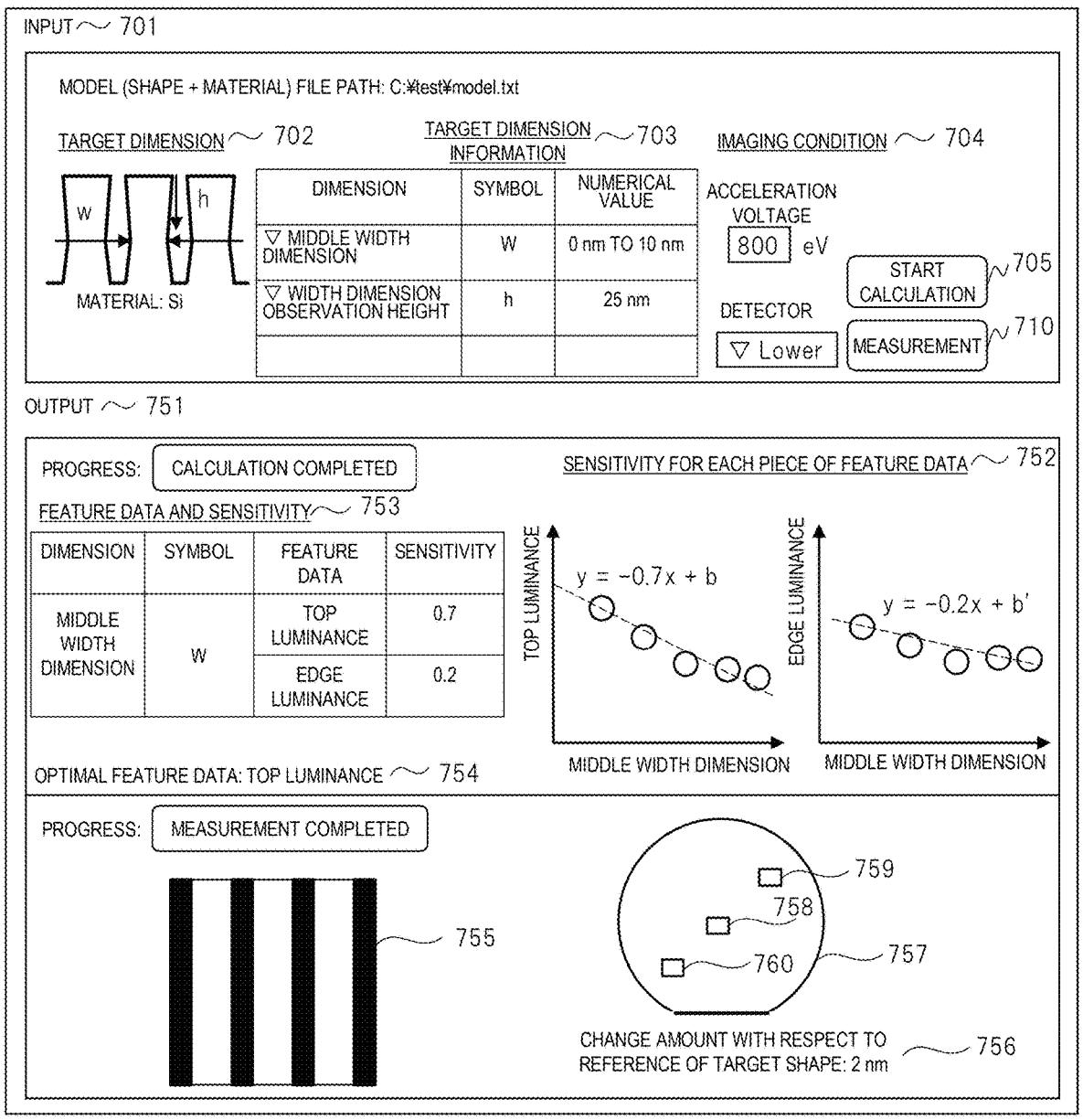
FIG. 7 is a diagram showing a configuration of a GUI according to the first embodiment.

FIG. 7 shows a configuration of the GUI in the observation system according to the first modification. In the observation system that executes the flowchart shown in FIG. 5, one sensitivity (correlation graph) is displayed in the output screen region 751 instead of the sensitivity for each piece of feature data 752, and one piece of feature data and one sensitivity are also displayed in the feature data and sensitivity list 753. The optimal feature data 754 is not displayed in the output screen region 751.

Second Modification

Although the L/S pattern has been described as an example of the target shape, the target shape is not limited thereto. In the second modification, examples other than the L/S pattern will be described.

FIGS. 8A to 8D are diagrams showing a target shape according to a second modification of the first embodiment.

Figure 8A:
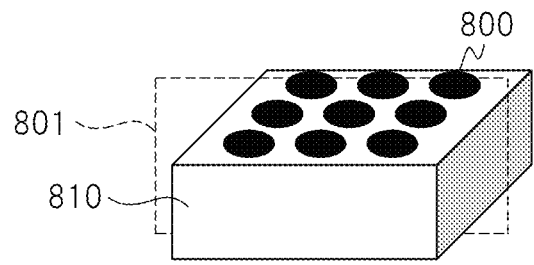
FIGS. 8A to 8D are diagrams showing a target shape according to a second modification of the first embodiment.

In FIG. 8A, a reference numeral 810 indicates a semiconductor layer (material: silicon) that is a specimen. A plurality of hole patterns 800 extending from a main surface UP toward a back surface DW are formed in the semiconductor layer 810. A cross-sectional view 803 viewed from a cross-section 801 of the semiconductor layer 810 on which the hole patterns 800 are formed is shown in FIG. 8B. As shown in FIG. 8B, the black hole patterns are formed in a manner of extending from the main surface UP toward the back surface DW. Therefore, even when the main surface UP is irradiated with the electron beam, a side wall SD of each of the hole patterns is not directly irradiated with the electron beam.

According to the first embodiment, a sensitivity is obtained in advance by repeatedly executing steps S502 to S504 shown in FIG. 5 by a predetermined or any processor, and a width w of each of the hole patterns 800 at a position at the depth h can be obtained using, for example, the sensitivity and a detection signal that is obtained by the electron beam emitted to a position 804 of the main surface UP and that is output from the electron microscope.

Figure 8C:
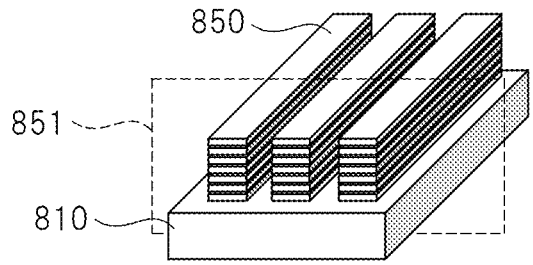
Figure 8B:
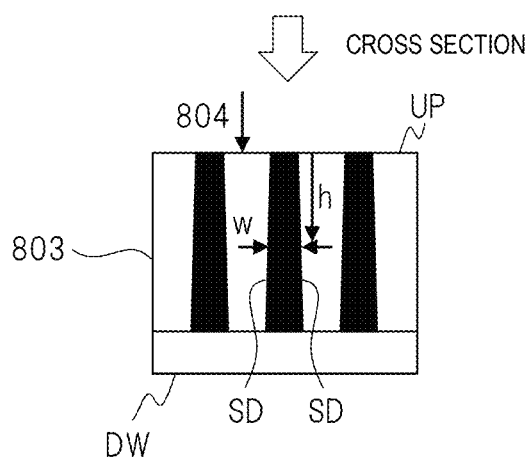
Figure 8D:
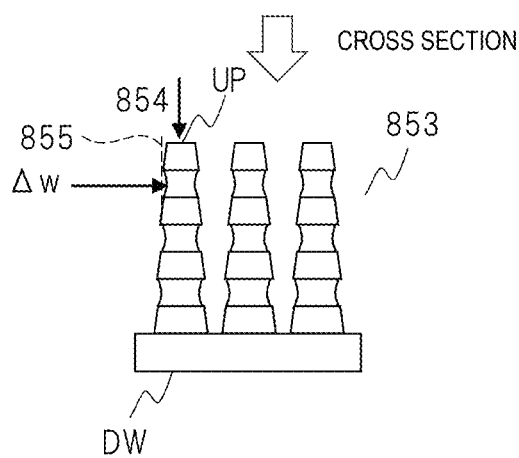

FIG. 8C shows a specimen in which a pattern shape 850 of a stacked structure, which is called gate all around (GAA), is formed. A cross-sectional view 853 viewed from a cross section 851 is shown in FIG. 8D. As shown in FIG. 8D, in the pattern shape (GAA) 850, a recessed region is formed with respect to a virtual line 855 that connect two layers protruding in a lateral direction. Even when the main surface UP is irradiated with the electron beam, the recessed region is not directly irradiated with the electrons, and it is difficult to observe an amount (indent amount) of recess OW.

According to the first embodiment, a sensitivity is obtained in advance by repeatedly executing steps S502 to S504 shown in FIG. 5 by a predetermined or any processor, and the indent amount OW can be obtained using, for example, the sensitivity and a detection signal that is obtained by the electron beam emitted to a position 854 of the main surface UP and that is output from the electron microscope.

According to the first embodiment, one or more values related to the shape change in the target portion can be output using the detection signal obtained based on the electrons emitted to the surface position on the specimen which is different from the target portion.

For example, by obtaining a distribution of values related to a shape change in a target shape in a plane of a semiconductor wafer, a manufacturing process can be improved and controlled using the obtained distribution.

The example has been described in which one piece of feature data (for example, the pattern top luminance or the pattern edge luminance) represented by the detection signal output from the electron microscope is used, but the invention is not limited thereto. For example, a plurality of pieces of feature data represented by detection signals may be used in combination. For example, the pattern top luminance and the pattern edge luminance that are the feature data may be combined. In this case, the sensitivity related to the pattern top luminance obtained in advance and the sensitivity related to the pattern edge luminance obtained in advance are weighted and added. An addition result is divided by 2 (½), and a result thereof is used as a combination sensitivity. In this case, one or more values related to the shape change in the target shape are output based on the pattern top luminance and the pattern edge luminance that are represented by the detection signals, and the combination sensitivity obtained in advance.

A cross-sectional image prepared by executing a simulation while changing the target dimension or a cross-sectional image obtained by a cross-sectional scanning electron microscope (SEM) may be used as a correct value of the target shape, and the value related to the shape change in the target shape obtained by the observation system 1 may be calibrated. Since accuracy of the value output from the observation system 1 is improved by the calibration, the value output from the observation system 1 can be used for grasping an absolute value of the target shape of the pattern shape or for evaluating and inspecting the pattern shape. Of course, the method for obtaining the correct value of the target dimension is not limited to the simulation and the cross-sectional SEM.

Second Embodiment

In the second embodiment, a technique for optimizing the imaging condition of the electron microscope when observing the shape change in the target shape in the observation system described in the first embodiment will be described. Here, the acceleration voltage for accelerating the electrons in the electron microscope will be described as an example of the imaging condition. The acceleration voltage that is the imaging condition is instructed from the processor 209 shown in FIG. 2 to the control device 120 (FIG. 1) as an output of the computer 200 (FIG. 1). The control device 120 controls the electron microscope so as to accelerate the electrons at the instructed acceleration voltage.

In the second embodiment, the target shape will also be described using the side wall SD having the bowing shape described with reference to FIG. 3 as an example.

Figure 9:
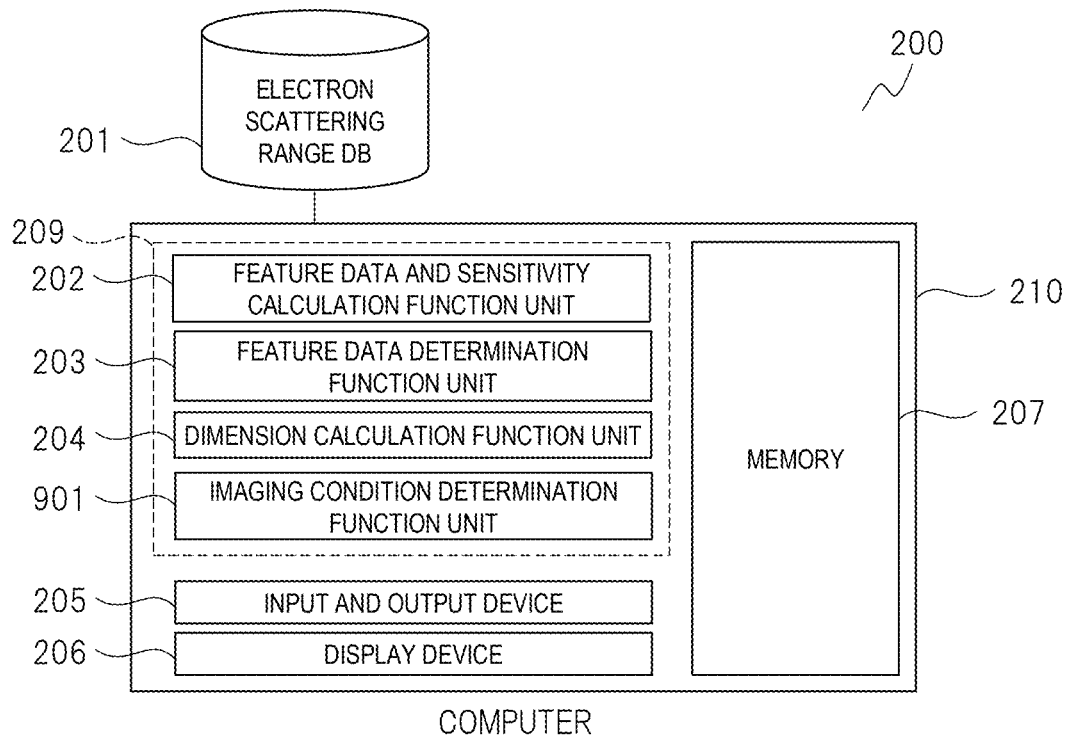
FIG. 9 is a block diagram showing a configuration of a computer according to a second embodiment.

FIG. 9 is a block diagram showing a configuration of a computer according to the second embodiment. Since an electron microscope, a control device, and the like according to the second embodiment are the same as those shown in FIG. 1, the description thereof will be omitted unless necessary. Since FIG. 9 is similar to FIG. 2, differences will be mainly described. The differences are that an imaging condition determination function unit 901 is added to the processor 209 and that the electron scattering range DB 201 is changed in FIG. 9.

The imaging condition determination function unit 901 is implemented on the processor 209 by executing a corresponding program by the processor 209 similarly to other functional units (for example, the feature data and sensitivity calculation function unit 202).

Figure 10:
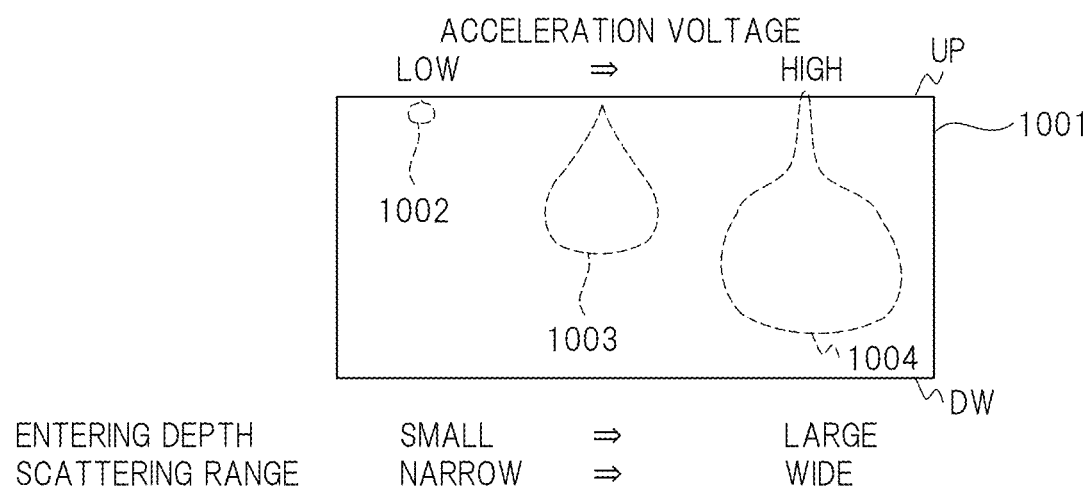
FIG. 10 is a diagram showing an observation system according to the second embodiment.

The change of the electron scattering range DB 201 will be described later with reference to FIGS. 10 and 11, and thus the description thereof will be omitted here. In FIG. 9, the feature data DB 208 shown in FIG. 2 is omitted.

Acceleration Voltage and Electron Scattering Range

First, a relation between the acceleration voltage and the electron scattering range of electrons scattered in the specimen will be described. FIGS. 10 and 11 are diagrams showing an observation system according to the second embodiment. FIG. 10 schematically shows the relation between the acceleration voltage and the electron scattering range. In FIG. 10, a reference numeral 1001 indicates a specimen irradiated with an electron beam. Here, it is assumed that the specimen 1001 is formed of a uniform material (silicon).

The electron beam is emitted in a direction from a main surface UP toward a back surface DW of the specimen 1001. When the electron beam is emitted, a depth and a scattering range of electrons entering the specimen 1001 change according to the acceleration voltage. In FIG. 10, electron scattering ranges in the specimen 1001 are indicated by broken lines 1002 to 1004. That is, when the acceleration voltage is low, the electrons are accelerated at a low rate. Therefore, the entering depth is small and the scattering range is also narrowed, such as the scattering range 1002. In contrast, when the acceleration voltage is high, the electrons are accelerated at a high rate. Therefore, the entering depth is large and the scattering range is also widened, such as the scattering range 1004. When the acceleration voltage is a voltage (intermediate voltage) between the low acceleration voltage and the high acceleration voltage, the electrons are accelerated at a medium rate. Therefore, the entering depth and the scattering range are values between those at the low acceleration voltage and the high acceleration voltage, such as the scattering range 1003.

Shapes of the scattering ranges 1002 to 1004 also change due to the change in the material of the specimen 1001.

Figure 11:
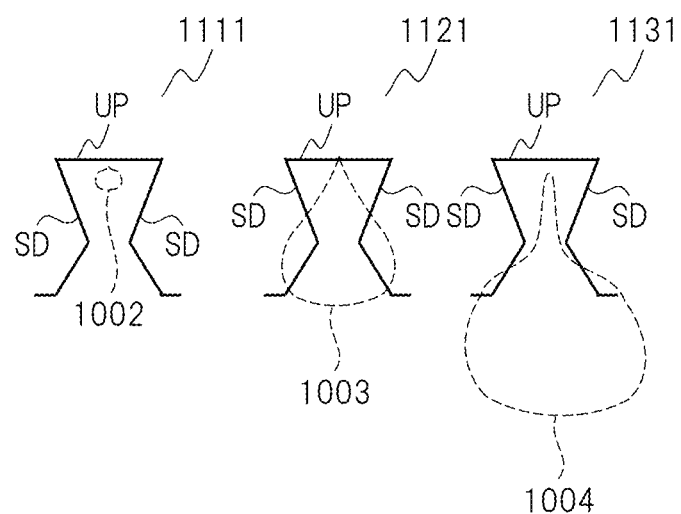
FIG. 11 is a diagram showing the observation system according to the second embodiment.

FIG. 11 schematically shows a relation between the electron scattering range and an L/S pattern having a bowing shape.

A relation between the electron scattering range and the L/S pattern when the acceleration voltage is low is indicated by a reference numeral 1111 in FIG. 11. A relation between the electron scattering range and the L/S pattern when the acceleration voltage is high is indicated by a reference numeral 1131 in FIG. 11. Similarly, a relation between the electron scattering range and the L/S pattern when the acceleration voltage is the intermediate voltage is indicated by a reference numeral 1121 in FIG. 11.

As shown in the relation 1111, when the acceleration voltage is low, the electrons are accelerated at the low rate, and thus the scattering range is narrowed as shown in the scattering range 1002. Since the electron scattering range is narrow, the electrons do not scatter to the side wall SD having the bowing shape, and a small number of electrons escape from the side wall SD to the outside of the specimen. In contrast, as shown in the relation 1131, when the acceleration voltage is high, the electrons are accelerated at the high rate. Therefore, the scattering range becomes like the scattering range 1004, and a position at which the electrons are scattered is lowered toward the back surface DW (FIG. 10) facing the main surface UP. That is, the position of the electron scattering range 1004 is lower than a position of the bowing shape, and a small number of electrons escape from the side wall SD having the bowing shape to the outside of the specimen.

On the other hand, when the acceleration voltage is the intermediate voltage, a position of the electron scattering range 1003 substantially coincides with the position of the bowing shape as shown in the relation 1121, and thus a large number of electrons escape from the side wall SD having the bowing shape to the outside of the specimen.

As described in the first embodiment, in the observation system, the shape change in the bowing shape is observed based on the detection signal by observing the number of electrons escaping from the bowing shape. In this case, the more electrons escape, the more information related to the bowing shape is included in the detection signal. In other words, the more electrons escape, the more information related to the bowing shape represented by the detection signal is. Therefore, it is preferable and desirable that a large number of electrons escape from the bowing shape. That is, an appropriate voltage for observing the target shape is present as the acceleration voltage. In the example shown in FIGS. 10 and 11, the intermediate voltage is the appropriate voltage for observing the target shape.

In the second embodiment, a simulation for obtaining the electron scattering range while changing the material and the acceleration voltage is executed in advance. By this simulation, a plurality of electron scattering ranges corresponding to a plurality of acceleration voltages are obtained for each material, and the obtained electron scattering ranges corresponding to the acceleration voltages are registered in advance in the electron scattering range DB 201.

As will be described later, an optimal electron scattering range corresponding to the target shape is selected from the electron scattering range DB 201.

Operation of Observation System

Figure 12:
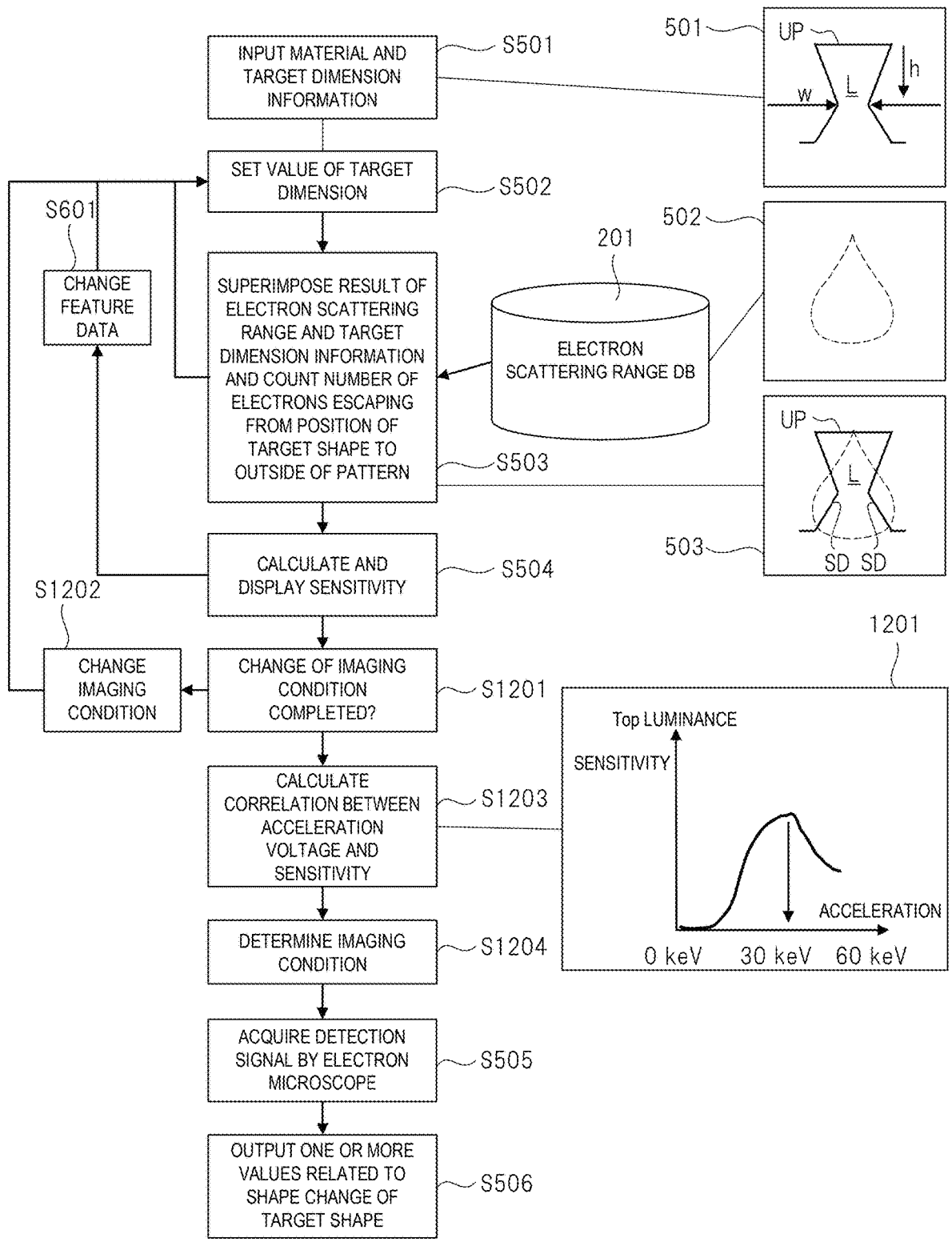
FIG. 12 is a flowchart showing an operation of the observation system according to the second embodiment.

FIG. 12 is a flowchart showing the operation of the observation system according to the second embodiment. Since FIG. 12 is similar to FIG. 6, a difference will be mainly described. The difference is that in FIG. 12, steps S1201 to S1204 are added to the steps shown in FIG. 6. In FIG. 12, step S602 shown in FIG. 6 is omitted. The imaging condition determination function unit 901 shown in FIG. 9 is implemented by the processor 209 shown in FIG. 9 executing a program corresponding to steps S1201 to S1204.

Since the operations of steps S501 to S506 and step S601 have already been described with reference to FIGS. 5 and 6, the description thereof will be omitted.

The processor 209 executes steps S502 to S504 and S601 to calculate a sensitivity for each piece of feature data at a predetermined imaging condition (for example, a condition in which the acceleration voltage is a low voltage). That is, the processor 209 reads an electron scattering range (for example, 1002 in FIG. 10) from the electron scattering range DB 201 when the acceleration voltage is low, and calculates the sensitivity for each piece of feature data (for example, the pattern top luminance and the pattern edge luminance) using the read electron scattering range.

In step S1201, the processor 209 determines whether the change of the imaging condition is completed. For example, as the imaging condition, when three imaging conditions (a condition in which the acceleration voltage is a low voltage, a condition in which the acceleration voltage is an intermediate voltage, and a condition in which the acceleration voltage is a high voltage) are present, the processor 209 determines in step S1201 whether all the three imaging conditions are completed.

When it is determined in step S1201 that the condition in which the acceleration voltage is the intermediate voltage and the condition in which the acceleration voltage is the high voltage are not yet completed, the processor 209 changes the imaging condition in the next step S1202. That is, the processor 209 reads, for example, an electron scattering range (for example, 1003 in FIG. 10) from the electron scattering range DB 201 when the acceleration voltage is the intermediate voltage. Thereafter, the processor 209 executes steps S502 to S504 and S601. By executing steps S502 to S504 and S601, the sensitivity for each piece of feature data is calculated using the electron scattering range when the acceleration voltage is the intermediate voltage.

The processor 209 repeatedly executes steps S502 to S504, S601, S1201, and S1202 until the processor 209 determines that the change of all the imaging conditions is completed in step S1201. When the change of all the imaging conditions is completed, the sensitivity for each piece of feature data is calculated under each imaging condition.

Thereafter, the processor 209 calculates a correlation between the acceleration voltage and the sensitivity in step S1203. A correlation graph obtained by this calculation is shown as 1201 in FIG. 12. The correlation graph 1201 shows an example in which the pattern top luminance is used as the feature data. A horizontal axis represents the acceleration voltage (acceleration), and a vertical axis represents the sensitivity of the pattern top luminance (top luminance). According to the correlation graph 1201, the sensitivity is highest when the acceleration voltage is around 30 keV.

Next, the processor 209 determines an imaging condition in step S1204. For example, the acceleration voltage (30 keV) at which the sensitivity is the highest is determined as the imaging condition. The processor 209 notifies the control device 120 (FIG. 1) of the determined imaging condition, and the control device 120 sets the acceleration voltage of the electron microscope 100 (FIG. 1) according to the imaging condition. Subsequent to step S1204, the processor 209 acquires a detection signal from the electron microscope 100 in step S505, and outputs one or more values related to the shape change in the target shape in step S506. Since steps S505 and S506 have already been described, the description thereof is omitted. However, in step S505, the acceleration voltage that is a setting condition of the electron microscope 100 is determined in step S1204.

In FIG. 12, an example has been described in which the imaging condition is determined by the imaging condition determination function unit 901, but the invention is not limited thereto. For example, the processor 209 may cause the display device to display a correlation graph for each piece of feature data, and the user may select an appropriate imaging condition.

Display Example of Display Device

Figure 13:
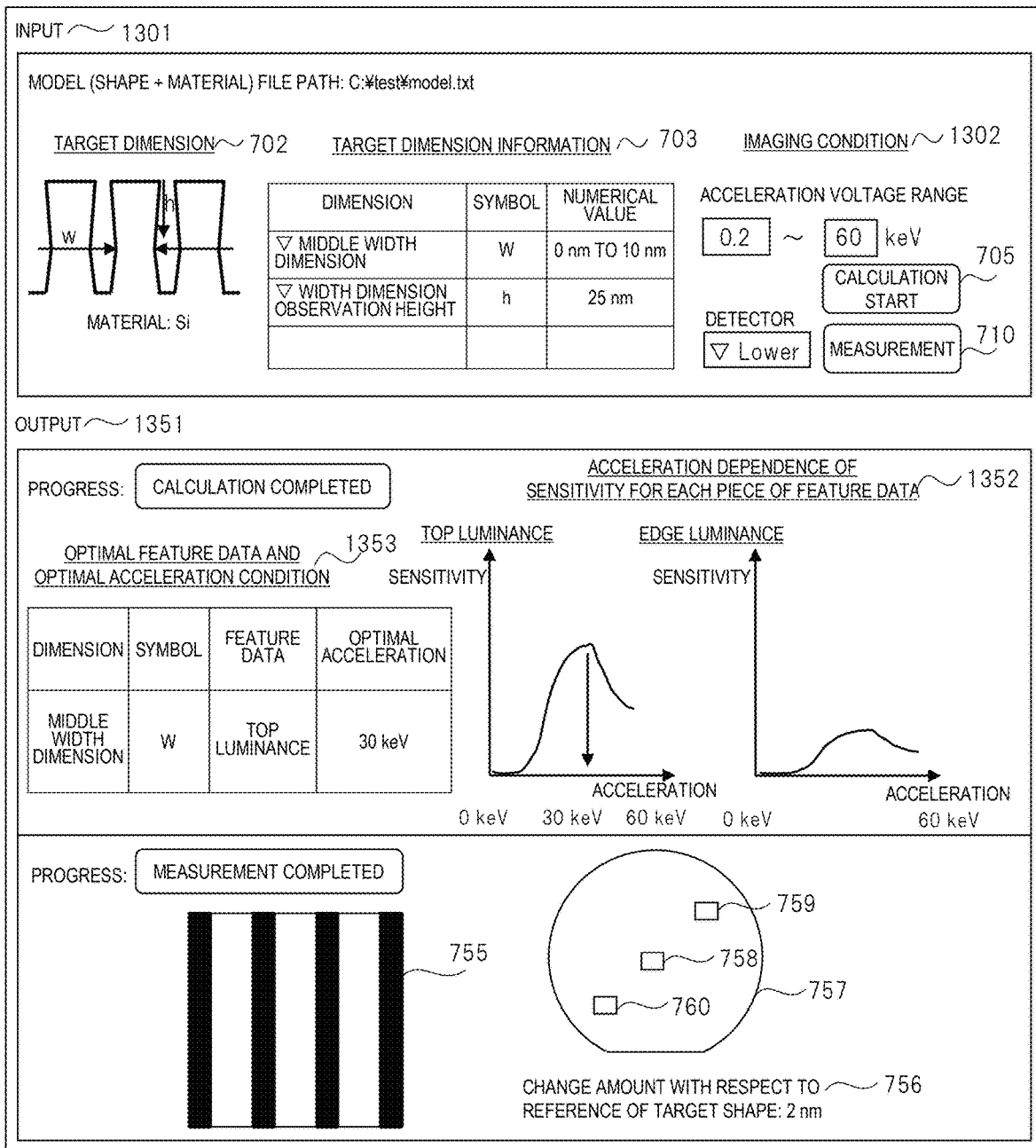
FIG. 13 is a diagram showing a configuration of a GUI according to the second embodiment.

FIG. 13 is a diagram showing a configuration of a GUI according to the second embodiment. Since FIG. 13 is similar to FIG. 7, a difference will be mainly described. The difference is that, in FIG. 13, the input screen region 701 in FIG. 7 is changed to an input screen region 1301 and the output screen region 751 in FIG. 7 is changed to an output screen region 1351.

In the input screen region 1301, the imaging condition 704 is changed to an imaging condition 1302. In the imaging condition 1302, an acceleration voltage range is provided such that the acceleration voltage set in the electron microscope 100 can be input as a voltage range instead of being input as a predetermined value as shown in FIG. 7. The user inputs a range of the acceleration voltage to the acceleration voltage range. Values of the acceleration voltage set in the acceleration voltage range are used in step S1201 in FIG. 12. For example, a lower limit voltage (0.2 keV in FIG. 13) set in the acceleration voltage range corresponds to the predetermined imaging condition described in FIG. 12 (for example, the condition in which the acceleration voltage is the low voltage), and an upper limit voltage (60 keV) corresponds to the high voltage described with reference to FIG. 12. Therefore, the processor 209 executes steps S502 to S506, S601, and S1201 to S1204 shown in FIG. 12 while changing the acceleration voltage from the lower limit voltage to the upper limit voltage shown in FIG. 13.

In the output screen region 1351, the feature data and sensitivity list 753 and the optimal feature data 754 shown in FIG. 7 are changed to an optimal feature data and optimal acceleration condition list 1353, and the sensitivity (correlation graph) for each piece of feature data 752 shown in FIG. 7 is changed to an acceleration dependence (correlation graph) 1352 of a sensitivity for each piece of feature data.

The processor 209 displays the acceleration voltage, which is the imaging condition determined by executing step S1204 in FIG. 12, as the optimal acceleration voltage (optimal acceleration in FIG. 13) in the optimal feature data and optimal acceleration condition list 1353. The processor 209 displays the feature data determined by executing step S602 (omitted in FIG. 12) shown in FIG. 6 in the optimal feature data and optimal acceleration condition list 1353. Further, the processor 209 displays the correlation graph of the sensitivity for each piece of feature data, which is obtained by executing step S1203 in FIG. 12, as the acceleration dependence (correlation graph) 1352 of the sensitivity for each piece of feature data.

The processor 209 acquires the image 755 of the specimen from the electron microscope 100 in response to pressing the measurement button 710 by the user, calculates the feature data based on the acquired image, and outputs the change amount 756 with respect to the reference of the target shape.

The acceleration voltage to the electrons emitted to the specimen has been described as an example of the imaging condition, but the invention is not limited thereto. For example, the electron scattering range DB 201 (FIG. 9) may store not only the electron scattering range but also an electron energy and electron trajectory information including an electron position and/or an electron traveling direction. In this case, in step S503 (FIG. 12), the number of electrons may be counted in consideration of not only the number of electron but also the direction in which the electrons escape or the energy at that time. The sensitivity for each of an arrangement of the detector 113 (FIG. 1) of the electron microscope 100 and a band of a detection energy filter (not shown) disposed in front of the detector may be calculated in step S504. The correlation between the acceleration and the sensitivity may be calculated in step S1203 (FIG. 12) for each of the arrangement of the detector 113 and the detection energy filter. An optimal value of the arrangement of the detector 113 and an optimal value of the detection energy filter may be derived.

According to the second embodiment, it is possible to optimize the imaging condition of the electron microscope when observing the shape change in the target shape that cannot be directly irradiated with the electron beam.

Third Embodiment

In the first embodiment and the second embodiment, the electron scattering range obtained by the electron scattering simulation is used for observing the shape change in the target shape. In the third embodiment, an example will be described in which images actually captured by the electron microscope are used instead of the electron scattering simulation.

Figure 14:
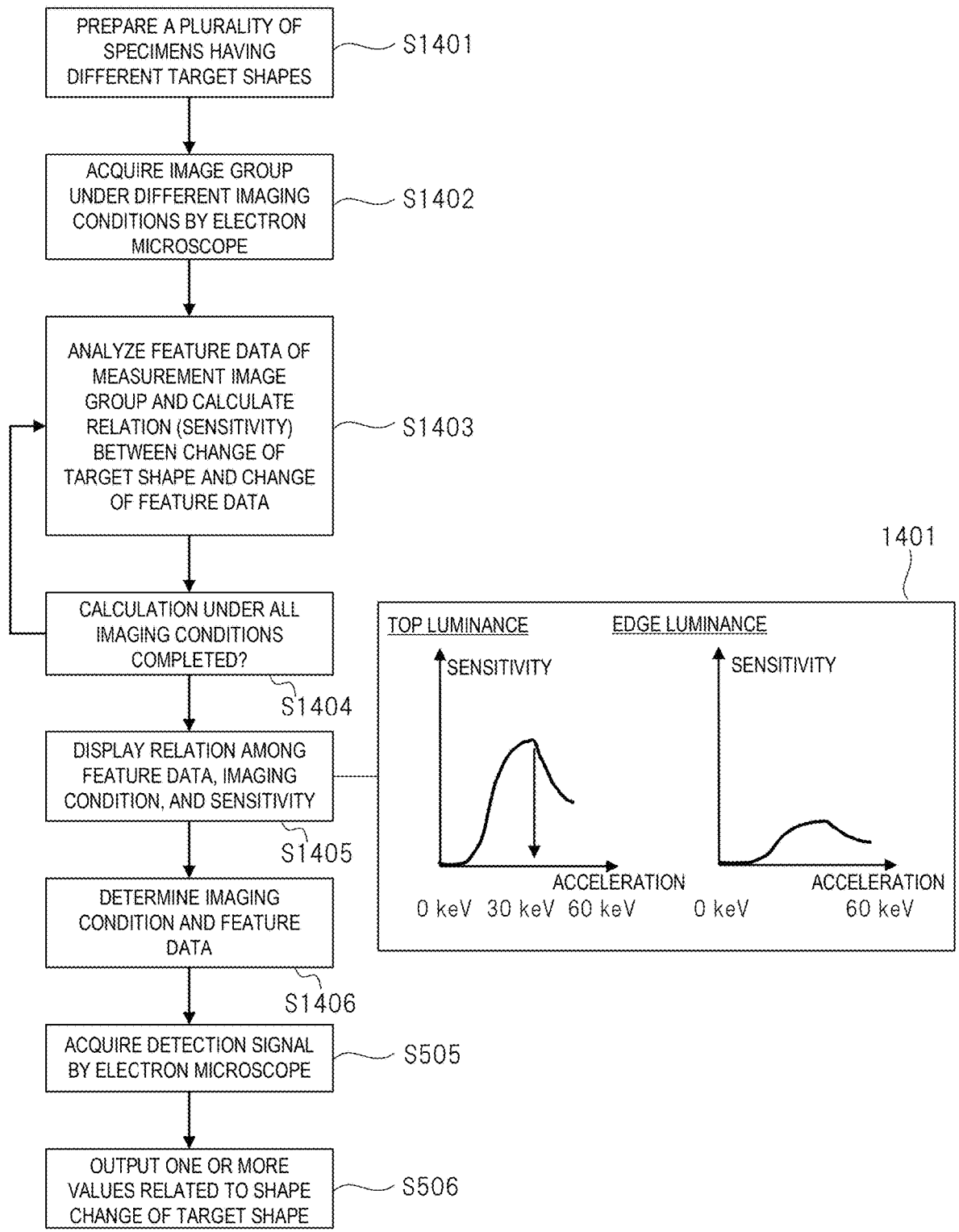
FIG. 14 is a flowchart showing an operation of an observation system according to a third embodiment.

FIG. 14 is a flowchart showing an operation of an observation system according to the third embodiment.

First, in step S1401, a plurality of specimens having target shapes whose dimensions are different are prepared.

In step S1402, the processor 209 (FIG. 2) uses the plurality of specimens prepared in step S1401 as samples and acquires an image or a luminance of each of the samples by the electron microscope 100 (FIG. 1) to form one image group. In step S1402, a plurality of image groups are acquired by acquiring images of the samples while changing the imaging condition (for example, the acceleration voltage) of the electron microscope 100.

In step S1403, the processor 209 analyzes the feature data (for example, the pattern top luminance, the pattern edge luminance, or the like) of the image group (measurement image group), and calculates a relation (sensitivity) between the change of the target shape and a change of the feature data. In step S1404, the processor 209 determines whether the calculation in step S1403 is completed under all the imaging conditions. When the calculation in step S1403 is not completed under all the imaging conditions, the processor 209 repeats steps S1403 and S1404 so as to execute the calculation in step S1403 on the measurement image group under an imaging condition under which the calculation is not completed.

When the processor 209 determines in step S1404 that the calculation is completed under all the imaging conditions, the processor 209 executes step S1405. In step S1405, the processor 209 calculates a relation between the imaging condition and the sensitivity for each piece of feature data, and displays the calculated relation on the display device 206 (FIG. 2). In FIG. 14, an example of a correlation graph displayed on the display device 206 is indicated by a reference numeral 1401. What is displayed on the display device 206 is not limited to the correlation graph 1401 in FIG. 14. For example, the relation among the feature data, the imaging condition, and the sensitivity may be displayed on a three-dimensional (3D) map in which a horizontal axis is the acceleration voltage that is the imaging condition, in which a vertical axis is the feature data, and in which a depth direction is a magnitude of the sensitivity.

In step S1406, the processor 209 determines an imaging condition and feature data using the feature data determination function unit 203 (FIG. 2) and the imaging condition determination function unit 901 (FIG. 9). Of course, the user may determine the imaging condition and the feature data based on the sensitivity and the like shown in the correlation graph 1401.

Thereafter, in step S505, the processor 209 acquires a detection signal from the electron microscope 100, and outputs one or more values related to the shape change in the target shape in step S506.

As described above, a plurality of specimens are prepared in step S1401. Alternatively, for example, patterns of different target shapes formed at different positions in one semiconductor wafer may be prepared as target shapes. Of course, a plurality of specimens may be prepared using a plurality of semiconductor wafers instead of one semiconductor wafer.

According to the third embodiment, since the sensitivity is obtained using actual samples, the value related to the shape change in the target shape can be output using a more accurate sensitivity. The third embodiment may be combined with the first embodiment or the second embodiment. For example, the sensitivity obtained in the first embodiment or the second embodiment may be calibrated using the sensitivity obtained in the third embodiment, and the value related to the shape change in the target shape may be output using the calibrated sensitivity. A more accurate value related to the shape change can be output using the calibrated sensitivity.

In the embodiments described above, information such as a program for implementing each functional unit can be stored in a recording device such as a memory, a hard disk, or a solid state drive (SSD), or a recording medium such as an IC card, an SD card, or a DVD. Of course, each functional unit may be implemented by combining logic circuits and the like. An example of the processor is a CPU or a GPU.

In the first to third embodiments, the shape change in the target shape that cannot be directly irradiated with the electron beam can be quantified using a detection signal obtained by irradiating, with the electron beam, a predetermined portion (for example, the position of the first surface which is the first surface position) different from the target portion (formation position at which the target shape is formed) at which the target shape is formed.

Although the invention made by the inventor has been specifically described based on the embodiments, the invention is not limited to the embodiments, and various modifications can be made without departing from the scope of the invention.

What is claimed is:

1. An observation system comprising:
an electron microscope; and
a computer, wherein
the electron microscope is configured to irradiate, with electrons, a first surface position on a specimen, which is different from a formation position of a target shape on the specimen, detect, by a detector, predetermined electrons that are scattered in the specimen from the first surface position and that escape from the formation position of the target shape to an outside of the specimen, and output the predetermined electrons as a detection signal, and
the computer comprising one or more memory devices having a program stored thereon that, when executed by one or more processors, cause the one or more processors to:
output one or more values related to the target shape based on the detection signal, from the detector, output one or more values related to a shape change in the target shape with respect to a predetermined reference,
obtain in advance the number of electrons escaping from the formation position of the target shape while changing a dimension of the target shape, set the obtained number of electrons as a luminance, and obtain, as a sensitivity, a change in the luminance associated with the change in the dimension of the target shape, and
output the one or more values related to the shape change in the target shape based on the detection signal output from the electron microscope and the sensitivity.

2. The observation system according to claim 1, wherein the one or more processors are configured to output the one or more values related to the shape change in the target shape using an image luminance of the specimen represented by the detection signal.

3. The observation system according to claim 2, wherein the one or more processors are configured to use a pattern top luminance of the specimen as the image luminance.

4. The observation system according to claim 2, wherein the one or more processors are configured to use a pattern edge luminance of the specimen as the image luminance.

5. The observation system according to claim 2, wherein the one or more processors ae configured to combine a plurality of values that are represented by the detection signals and that change associated with the shape change in the target shape to output the one or more values related to the shape change in the target shape.

6. The observation system according to claim 1, wherein the one or more processors are configured to obtain in advance the numbers of electrons escaping from the formation position of the target shape to the outside of the specimen when the first surface position is irradiated with the electrons while changing imaging conditions, and obtain a plurality of electron scattering ranges corresponding to the imaging conditions based on the obtained numbers of electrons, and
the one or more processors are configured to set, in the electron microscope, an imaging condition corresponding to an appropriate electron scattering range among the plurality of electron scattering ranges, and the electron microscope is configured to output the detection signal.

7. The observation system according to claim 1, wherein the one or more processors are configured to acquire, from each of a plurality of samples having target shapes whose dimensions are different, an image or a luminance represented by the detection signal output from the electron microscope, and obtain in advance, as a sensitivity, a change in the luminance associated with a change in the dimension of the target shape, and
the computer is configured to output the one or more values related to the shape change in the target shape based on the detection signal output from the electron microscope and the sensitivity.

8. The observation system according to claim 1, wherein the computer includes a display device, and
the one or more processors are configured to display, on the display device, feature data of the detection signal used when the one or more values related to the shape change in the target shape are output, an imaging condition set in the electron microscope, and a shape change amount of the target shape.

9. The observation system of claim 1, wherein the one or more processors obtains a scattering range of electrons while changing the electron voltage, and comprises a database in which a plurality of acceleration voltages and a plurality of corresponding scattering ranges of electrons are registered, and wherein the one or more processors selects a scattering range of electrons from a plurality of scattering ranges of electrons registered in the database, superimposes the selected scattering range of electrons and the target shape while changing the target shape, obtains a number of electrons escaping from the formation position of the target shape, obtains a change in luminance accompanying a change in the target shape as sensitivity for each selected scattering range of electrons, obtains a correlation between an acceleration voltage corresponding to the selected scattering range of electrons and the sensitivity, and controls the electron microscope so that the electrons are accelerated at an acceleration voltage corresponding to high sensitivity.

10. An observation method for observing a specimen based on a detection signal output from an electron microscope, the observation method comprising:
irradiating, by the electron microscope, with electrons, a first surface position on a specimen, which is different from a formation position of a target shape on the specimen;
detecting, by the electron microscope, predetermined electrons that are scattered in the specimen from the first surface position and that escape from the formation position of the target shape to an outside of the specimen; and
outputting, by one or more processors that are configured to execute a program stored on one or more memory device on a computer, one or more values related to a shape change in the target shape based on the detection signal based on the detected predetermined electrons; wherein
the one or more processors acquires the number of electrons escaping from the formation position of the target shape while changing a dimension of the target shape, sets the obtained number of electrons as luminance, and obtains as a sensitivity, a change in luminance associated with the change in the dimensions of the target shape and outputs one or more values related to the shape change in the target shaped based on the detection signal output from the electron microscope and the sensitivity.

11. The observation method according to claim 10, wherein
the one or more processors acquires in advance an image or a luminance represented by the detection signal output from the electron microscope while changing a dimension of the target shape, and obtains, as a sensitivity, a change in the luminance associated with the change in the dimension of the target shape, and
the one or more processors outputs the one or more values related to the shape change in the target shape based on the detection signal output from the electron microscope and the sensitivity.

12. The observation method according to claim 11, wherein
the one or more processors obtains in advance the sensitivity while changing an imaging condition of the electron microscope, and obtains a plurality of sensitivities corresponding to a plurality of imaging conditions.

13. The observation method of claim 10, wherein the computer includes a database in which a scattering range of electrons is obtained while changing an acceleration voltage, which accelerates the electrons, a plurality of scattering ranges of electrons corresponding to a plurality of acceleration voltages are registered, and the one or more processors selects a scattering range of electrons from the plurality of scattering ranges of electrons registered in the database, superimposes the selected scattering range of electrons and the target shape, while changing the target shape, obtains a number of electrons escaping from the formation position of the target shape, obtains a change in luminance accompanying a change in the target shape as a sensitivity for each selected scattering range or electrons, obtains a correlation between an acceleration voltage corresponding to the selected scattering range of electrons and the sensitivity, and controls the electron microscope so that the electrons are accelerated at an acceleration voltage.

14. A program storable in a non-transitory memory comprising instructions for causing one or more processors to execute a process of observing a specimen using a detection signal output from an electron microscope, the program causing the one or more processors to execute a first process of irradiating, with electrons, a first surface position on the specimen, which is different from a formation position of a target shape of the specimen, while changing a dimension of the target shape, and obtaining a change in the number of electrons escaping from the formation position of the target shape to an outside of the specimen, wherein the first process includes a process of causing the one or more processors to superimpose an electron scattering range and the target shape, a second process of obtaining a sensitivity based on the change in the dimension of the target shape and the change in the number of electrons, a third process of outputting a value related to a shape change in the target shape based on the detection signal and the sensitivity.

15. The program according to claim 14, wherein the one or more processors obtains a scattering range of electrons while changing an acceleration voltage, which accelerates the electrons, and comprises a database in which a plurality of scattering ranges of electrons corresponding to a plurality of acceleration voltages are registered, and wherein, in the first processing, the processor selects a scattering range of electrons from the plurality of scattering ranges of electrons registered in the database, superimposes the selected scattering range of electrons and the target shape while changing the target shape, obtains a number of electrons escaping from the formation position of the target shape, obtains a change in luminance accompanying a change in the target shape as sensitivity for each selected scattering range of electrons, obtains a correlation between an acceleration voltage corresponding to the selected scattering range of electrons and the sensitivity, obtains an acceleration corresponding to high sensitivity based on the correlation between the acceleration voltage and the sensitivity obtains in the first processing, and controls the electron microscope so that the electrons are accelerated at the obtains acceleration voltage in the second processing.

* * * * *